(12) United States Patent
Sun et al.

(10) Patent No.: US 12,490,340 B2
(45) Date of Patent: *Dec. 2, 2025

(54) COMMUNICATION METHOD, APPARATUS, AND SYSTEM

(71) Applicant: Huawei Technologies Co., Ltd., Shenzhen (CN)

(72) Inventors: Dekui Sun, Shenzhen (CN); Shufeng Shi, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 377 days.

This patent is subject to a terminal disclaimer.

(21) Appl. No.: 18/153,928

(22) Filed: Jan. 12, 2023

(65) Prior Publication Data
US 2023/0171848 A1 Jun. 1, 2023

Related U.S. Application Data

(63) Continuation of application No. 16/824,267, filed on Mar. 19, 2020, now Pat. No. 11,564,284, which is a (Continued)

(30) Foreign Application Priority Data

Sep. 30, 2017 (CN) .......................... 201710923300.0

(51) Int. Cl.
*H04W 80/10* (2009.01)
*H04W 8/08* (2009.01)
(Continued)

(52) U.S. Cl.
CPC ............. *H04W 80/10* (2013.01); *H04W 8/08* (2013.01); *H04W 48/16* (2013.01); *H04W 68/005* (2013.01); *H04W 76/12* (2018.02)

(58) Field of Classification Search
CPC ....... H04W 80/10; H04W 8/08; H04W 48/16; H04W 68/005; H04W 76/12; H04W 4/46; H04W 24/02; H04W 36/12; H04W 4/08
See application file for complete search history.

(56) References Cited

U.S. PATENT DOCUMENTS 9,351,210 B2 5/2016 Duan
2002/0150091 A1 10/2002 Lopponen et al.
(Continued)

FOREIGN PATENT DOCUMENTS

CN 102413546 A 4/2012
CN 103609147 A 2/2014
(Continued)

OTHER PUBLICATIONS

Ericsson, "23.502: Call flows for application influence on traffic routing," SA WG2 Meeting #120, S2-1701754 (revision pf S2-17xxx), Mar. 27-31, 2017, Busan, Korea, 3 pages.
(Continued)

*Primary Examiner* — Shawn D Miller
(74) *Attorney, Agent, or Firm* — Slater Matsil, LLP

(57) ABSTRACT

A communication method, an apparatus, and a system in which a first session management function entity determines, based on information of a terminal group, user plane function entities accessed by terminals in a terminal group, and the first session management function entity determines a target user plane function entity based on the user plane function entities, where the target user plane function entity is used to perform communication between terminals in the terminal group. According to the method, the terminals in the terminal group are redirected to a same user plane function entity, namely, the target user plane function entity, so that communication between the terminals in the terminal group is locally implemented in the target user plane func-
(Continued)

tion entity. This shortens a communication path, and reduces a communication latency.

20 Claims, 11 Drawing Sheets

Related U.S. Application Data continuation of application No. PCT/CN2018/107580, filed on Sep. 26, 2018.

(51) Int. Cl.
*H04W 48/16* (2009.01)
*H04W 68/00* (2009.01)
*H04W 76/12* (2018.01)

(56) References Cited

U.S. PATENT DOCUMENTS

| | | |
|---|---|---|
| 2003/0231639 A1 | 12/2003 | Mikkola |
| 2004/0120474 A1 | 6/2004 | Lopponen et al. |
| 2015/0189564 A1 | 7/2015 | Duan |
| 2017/0171752 A1 | 6/2017 | Lee et al. |
| 2017/0213461 A1 | 7/2017 | Murray et al. |
| 2018/0199243 A1 | 7/2018 | Bharatia |
| 2018/0227743 A1 | 8/2018 | Faccin et al. |
| 2018/0270888 A1 | 9/2018 | Faccin |
| 2020/0007593 A1 | 1/2020 | Gu et al. |
| 2020/0107225 A1 | 4/2020 | Zhang et al. |
| 2020/0221340 A1 | 7/2020 | Hirata |
| 2020/0252837 A1* | 8/2020 | Kim .................. H04M 15/8044 |
| 2020/0296653 A1 | 9/2020 | Huang |
| 2021/0058748 A1 | 2/2021 | Liao |
| 2021/0136589 A1 | 5/2021 | Kawasaki et al. |
| 2021/0289390 A1 | 9/2021 | Zhou et al. |

FOREIGN PATENT DOCUMENTS

| | | |
|---|---|---|
| CN | 103781119 A | 5/2014 |
| CN | 106851856 A | 6/2017 |
| CN | 106937271 A | 7/2017 |
| CN | 107018542 A | 8/2017 |
| CN | 107071746 A | 8/2017 |
| EP | 1564929 B1 | 12/2008 |
| EP | 2536183 A1 | 12/2012 |
| EP | 2768260 A1 | 8/2014 |
| ES | 2883339 | 12/2021 |
| GB | 2583270 B | 4/2022 |

OTHER PUBLICATIONS

3GPP TS 22.186 V15.2.0 (Sep. 2017), 3rd Generation Partnership Project; Technical Specification Group Services and System Aspects; Enhancement of 3GPP support for V2X scenarios; Stage 1 (Release 15), 16 pages.
3GPP TS 23.501 V1.4.0 (Sep. 2017), 3rd Generation Partnership Project; Technical Specification Group Services and System Aspects; System Architecture for the 5G System; Stage 2 (Release 15), 151 pages.
3GPP TS 23.502 V1.2.0 (Sep. 2017), 3rd Generation Partnership Project; Technical Specification Group Services and System Aspects; Procedures for the 5G System; Stage 2 (Release 15), 165 pages.
Ericsson ,"23.502: Call flows for application influence on traffic routing", SA WG2 Meeting #120, S2-171754, Busan, Korea, Mar. 27-31, 2017, 3 pages.
Huawei et al., "TS 23.501: Relation between the SMF and UPF", S2-171870, SA WG2 Meeting #120, Mar. 27-31, 2017, Busen, Korea, total 8 pages.
Nokia et al., "23.501: Introducing SSC mode and UPF Selection", SA WG2 Meeting #118BIS, S2-170353, Spokane, WA, US, Jan. 16-20, 2017, 4 pages.

\* cited by examiner

COMMUNICATION METHOD, APPARATUS, AND SYSTEM

CROSS-REFERENCE TO RELATED APPLICATIONS

This application is a continuation of U.S. patent application Ser. No. 16/824,267, filed on Mar. 19, 2020, which is a continuation of International Application No. PCT/CN2018/107580, filed on Sep. 26, 2018, which claims priority to Chinese Patent Application No. 201710923300.0, filed on Sep. 30, 2017. All of the afore-mentioned patent applications are hereby incorporated by reference in their entireties.

TECHNICAL FIELD

Aspects of this application relate to the field of mobile communications technologies, and in particular, to a communication method, an apparatus, and a system.

BACKGROUND

One of the development objectives of mobile communications is to establish an extensive interconnection and interworking network that includes various types of terminals. This is also one of the starting points for developing the internet of things in a cellular communications framework currently. The internet of things enables terminals in a terminal group that includes a plurality of terminals to communicate with each other.

Currently, the terminals usually communicate with each other by using a 3rd generation partnership project (3GPP) network.

In some application scenarios, communication between the terminals in the terminal group poses a relatively high requirement on a latency. For example, communication between vehicles in a platoon that includes a plurality of vehicles poses a very high requirement on a communication latency.

How to reduce a communication latency in a communication application scenario in which a relatively high requirement is imposed on a latency is a problem which urgently needs to be resolved.

SUMMARY

Aspects of this application provides a communication method, an apparatus, and a system, so as to reduce a latency of communication between terminals in a terminal group.

According to a first aspect, this application provides a communication method. The method may be performed by a session management function entity or a chip in the session management function entity. The session management function entity may be an SMF entity in 5G communication, and may be another entity having a session management function in future communication. The communication method includes: A first session management function entity determines, based on information of a terminal group, user plane function entities accessed by terminals in a terminal group. The first session management function entity determines a target user plane function entity based on the user plane function entities. The target user plane function entity is used to perform communication between terminals in the terminal group. According to the method, the terminals in the terminal group are redirected to a same user plane function entity, namely, the target user plane function entity, so that communication between the terminals in the terminal group is locally implemented in the target user plane function entity. This shortens a communication path, and reduces a communication latency.

In a possible design, that the first session management function entity determines a target user plane function entity based on the user plane function entities includes: The first session management function entity selects the target user plane function entity from the user plane function entities accessed by the terminals or other user plane function entities based on one or more of the following factors: a service range of each of the user plane function entities accessed by the terminals, locations of the terminals in the terminal group, a quantity of terminals in the terminal group that are served by each of the user plane function entities accessed by the terminals, and a load of each of the user plane function entities accessed by the terminals. According to the method, a plurality of factors are comprehensively considered, so that a comparatively good user plane function entity can be selected as the user plane function entity. This helps improve communication quality.

In a possible design, the first session management function entity sends a first notification message to the target user plane function entity. The first notification message includes tunnel information of a first terminal, and a user plane function entity accessed by the first terminal is different from the target user plane function entity. The method is used to update tunnel information of the target user plane function entity, so as to implement local communication in the target user plane function entity.

In a possible design, the first session management function entity sends a second notification message to a base station accessed by the first terminal. The second notification message includes tunnel information of the target user plane function entity.

In a possible design, the first session management function entity releases a resource of the user plane function entity accessed by the first terminal.

In a possible design, the first session management function entity receives first instruction information from a policy control function entity. The first instruction information is used to instruct the first session management function entity to select a user plane function entity used by a terminal in the terminal group to perform communication.

In a possible design, the first session management function entity receives second instruction information from a policy control function entity. The second instruction information is used to instruct the first session management function entity to select a user plane function entity used by a second terminal in the terminal group to perform communication, and the second terminal is a terminal that is in the terminal group and that corresponds to the first session management function entity. That the first session management function entity determines a target user plane function entity based on the user plane function entities includes: The first session management function entity determines the target user plane function entity based on a user plane function entity accessed by the second terminal.

In a possible design, the first session management function entity receives a first request message from a target network element. The first request message is used to request the first session management function entity to select a user plane function entity used by a third terminal in the terminal group to perform communication, and the third terminal is a terminal that is in the terminal group and that corresponds to the target network element. The first session management function entity determines that the target user plane function entity is the user plane function entity used by the third terminal to perform communication. The target network element is a second session management function entity or an access and mobility management function entity. According to the method, when the first request message is received from the target network element, the previously determined target user plane function entity is used as a target user plane function entity of the terminal corresponding to the target network element, and there is no need to reselect a target user plane function entity. This helps reduce overheads.

In a possible design, the first request message includes tunnel information of a base station accessed by the third terminal, and tunnel information of a user plane function entity accessed by the third terminal.

In a possible design, the first session management function entity receives a second request message from a target network element. The second request message is used to request the first session management function entity to select a user plane function entity used by a third terminal in the terminal group to perform communication, and the third terminal is a terminal that is in the terminal group and that corresponds to the target network element. That the first session management function entity determines a target user plane function entity based on the user plane function entities includes: The first session management function entity determines the target user plane function entity based on a user plane function entity accessed by a second terminal. The second terminal is a terminal that is in the terminal group and that corresponds to the first session management function entity. The target network element is a second session management function entity or an AMF entity.

In a possible design, the second request message includes tunnel information of a base station accessed by the third terminal, and tunnel information of a user plane function entity accessed by the third terminal.

In a possible design, the first session management function entity receives the information of the terminal group from a control plane function entity or an application server.

In a possible design, the information of the terminal group includes an identifier of the terminal group and identifiers of the terminals in the terminal group. The first session management function entity stores the target user plane function entity and the identifier of the terminal group in contexts of the terminals in the terminal group. The contexts of the terminals in the terminal group are used by the first session management function entity to obtain the target user plane function entity from the contexts of the terminals in the terminal group. Alternatively, the first session management function entity locally stores a correspondence between the target user plane function entity and the identifier of the terminal group. The correspondence is used by the first session management function entity to obtain the target user plane function entity from the correspondence. According to the method, the determined target user plane function entity is stored in the contexts of the terminals or locally stored in the session management function entity, so as to obtain the target user plane function entity.

According to a second aspect, this application provides a communication method. The method may be performed by a policy control function entity or a chip in the policy control function entity. The policy control function entity may be a PCF entity in 5G, and may be another entity having a policy control function in future communication. The communication method includes: A policy control function entity obtains information of a terminal group. The information of the terminal group includes at least identifiers of terminals in a terminal group. The policy control function entity determines a first session management function entity based on the identifiers of the terminals in the terminal group. The first session management function entity is configured to select a target user plane function entity, and the target user plane function entity is used to perform communication between terminals in the terminal group.

In a possible design, that the policy control function entity determines a first session management function entity based on the identifiers of the terminals in the terminal group includes: The policy control function entity determines, based on the identifiers of the terminals in the terminal group, session management function entities accessed by the terminals in the terminal group. The policy control function entity determines the first session management function entity based on the session management function entities accessed by the terminals.

In a possible design, that the policy control function entity determines the first session management function entity based on the session management function entities accessed by the terminals includes: The policy control function entity determines the first session management function entity based on a quantity of terminals in the terminal group that are served by each of the session management function entities corresponding to the terminals in the terminal group.

In a possible design, that a policy control function entity obtains information of a terminal group includes: The policy control function entity receives the information of the terminal group from a control plane function entity or an application server.

In a possible design, the policy control function entity sends first instruction information to the first session management function entity. The first instruction information is used to instruct the first session management function entity to select a user plane function entity used by a terminal in the terminal group to perform communication.

In a possible design, the policy control function entity sends second instruction information to the first session management function entity. The second instruction information is used to instruct the first session management function entity to select a user plane function entity used by a second terminal in the terminal group to perform communication, and the second terminal is a terminal that is in the terminal group and that corresponds to the first session management function entity.

In a possible design, the policy control function entity sends a notification message to a target network element. The notification message includes the information of the terminal group and address information of the first session management function entity, and the notification message is used to instruct the target network element to insert the first session management function entity into a session of a third terminal in the terminal group, and instruct the first session management function entity to select a user plane function entity used by the third terminal to perform communication. The target network element is a second session management function entity or an AMF entity, and the third terminal is a terminal that is in the terminal group and that corresponds to the target network element.

According to a third aspect, this application provides an apparatus. The apparatus may be a session management function entity, or may be a chip in the session management function entity. The apparatus has functions of implementing various designs of the first aspect. The functions may be implemented by hardware, or may be implemented by hardware executing corresponding software. The hardware or the software includes one or more modules corresponding to the functions.

In a possible design, when the apparatus is the session management function entity, the session management function entity includes a processing unit and a communications unit. The processing unit may be, for example, a processor. The communications unit may be, for example, a transceiver. The transceiver includes a radio frequency circuit. Optionally, the session management function entity further includes a storage unit. The storage unit may be, for example, a memory. When the session management function entity includes a storage unit, the storage unit stores a computer executable instruction. The processing unit is connected to the storage unit. The processing unit executes the computer executable instruction stored in the storage unit, so that the session management function entity performs the communication method in the first aspect.

In another possible design, when the apparatus is the chip in the session management function entity, the chip includes a processing unit and a communications unit. The processing unit may be, for example, a processor. The communications unit may be, for example, an input/output interface, a pin, or a circuit. The processing unit may execute a computer executable instruction stored in a storage unit, so that the communication method in the first aspect is performed. Optionally, the storage unit is a storage unit inside the chip, for example, a register or a cache, or the storage unit may be a storage unit outside the chip in the session management function entity, for example, a read-only memory (ROM), another type of static storage device capable of storing static information and instructions, or a random access memory (RAM).

The processor mentioned above may be a general-purpose central processing unit (CPU), a microprocessor, an application-specific integrated circuit (ASIC), or one or more integrated circuits configured to control program execution of the communication method in the first aspect.

According to a fourth aspect, this application provides an apparatus. The apparatus may be a policy control function entity, or may be a chip in the policy control function entity. The apparatus has functions of implementing various designs of the second aspect. The functions may be implemented by hardware, or may be implemented by hardware executing corresponding software. The hardware or the software includes one or more modules corresponding to the functions.

In a possible design, when the apparatus is the policy control function entity, the policy control function entity includes a processing unit and a communications unit. The processing unit may be, for example, a processor. The communications unit may be, for example, a transceiver. The transceiver includes a radio frequency circuit. Optionally, the policy control function entity further includes a storage unit. The storage unit may be, for example, a memory. When the terminal includes a storage unit, the storage unit stores a computer executable instruction. The processing unit is connected to the storage unit. The processing unit executes the computer executable instruction stored in the storage unit, so that the policy control function entity performs the communication method in the second aspect.

In another possible design, when the apparatus is the chip in the policy control function entity, the chip includes a processing unit and a communications unit. The processing unit may be, for example, a processor. The communications unit may be, for example, an input/output interface, a pin, or a circuit. The processing unit may execute a computer executable instruction stored in a storage unit, so that the communication method in the second aspect is performed. Optionally, the storage unit is a storage unit inside the chip, for example, a register or a cache, or the storage unit may be a storage unit outside the chip in the policy control function entity, for example, a ROM, another type of static storage device capable of storing static information and instructions, or a RAM.

The processor mentioned above may be a general-purpose CPU, a microprocessor, an ASIC, or one or more integrated circuits configured to control program execution of the communication method in the second aspect.

According to a fifth aspect, this application further provides a computer-readable storage medium. The computer-readable storage medium stores an instruction. When the instruction is run on a computer, the computer is enabled to perform the method in either of the foregoing aspects.

According to a sixth aspect, this application further provides a computer program product including an instruction. When the instruction is run on a computer, the computer is enabled to perform the method in either of the foregoing aspects.

In addition, for technical effects brought by any design manner of the second aspect to the sixth aspect, refer to technical effects brought by different design manners of the first aspect. Details are not described herein again.

These aspects or other aspects in this application are simpler and easier to understand in descriptions in the following embodiments.

DETAILED DESCRIPTION OF ILLUSTRATIVE EMBODIMENTS

To make the objectives, technical solutions, and advantages of this application clearer, the following further describes this application in detail with reference to the accompanying drawings. A specific operation method in a method embodiment may also be applied to an apparatus embodiment or a system embodiment. In the description of this application, unless otherwise stated, "a plurality of" means two or more than two.

Figure 1A:
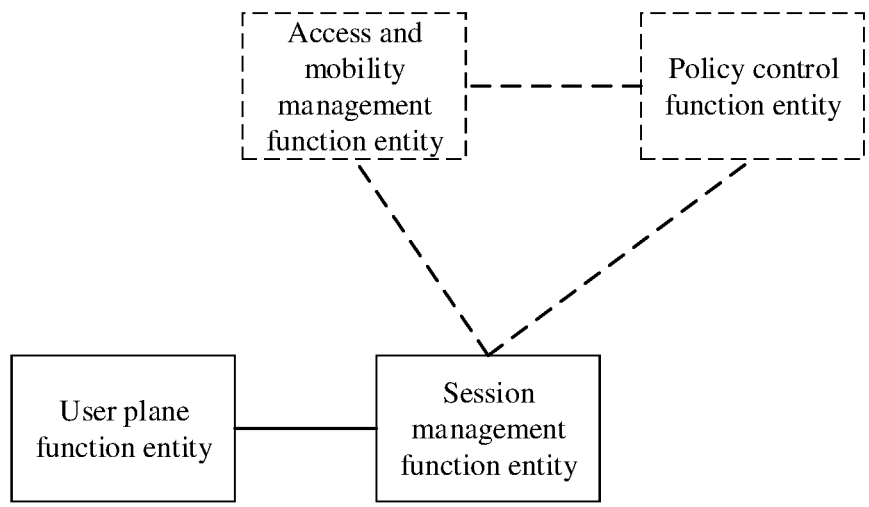
FIG. 1(a) is a schematic diagram of a communications system according to an embodiment of this application.

FIG. 1(*a*) is a schematic diagram of a communications system according to an embodiment of this application. The communications system includes a user plane function entity and a session management function entity. Optionally, the communications system further includes either of an access and mobility management function entity and a policy control function entity.

In the figure, there may be one or more user plane function entities, and there may be one or more session management function entities. For ease of description, an example in which there are one user plane function entity and one session management function entity is used for description in the figure.

A target user plane function entity in user plane function entities is used to perform communication between terminals in a terminal group.

The session management function entity is configured to: determine, based on information of a terminal group, user plane function entities accessed by terminals in the terminal group, and determine the target user plane function entity based on the user plane function entities.

In an implementation, the session management function entity further selects the target user plane function entity from the user plane function entities accessed by the terminals or other user plane function entities based on one or more of the following factors: a service range of each of the user plane function entities accessed by the terminals, locations of the terminals in the terminal group, a quantity of terminals in the terminal group that are served by each of the user plane function entities accessed by the terminals, and a load of each of the user plane function entities accessed by the terminals.

In an implementation, the session management function entity further sends a first notification message to the target user plane function entity. The first notification message includes tunnel information of a first terminal, and a user plane function entity accessed by the first terminal is different from the target user plane function entity.

In an implementation, the session management function entity sends a second notification message to a base station accessed by the first terminal. The second notification message includes tunnel information of the target user plane function entity.

The policy control function entity is configured to: obtain information of a terminal group, where the information of the terminal group includes at least identifiers of terminals in the terminal group; and determine a first session management function entity based on the identifiers of the terminals in the terminal group, where the first session management function entity is configured to select a target user plane function entity, and the target user plane function entity is used to perform communication between terminals in the terminal group.

In an implementation, the policy control function entity determines, based on the identifiers of the terminals in the terminal group, session management function entities accessed by the terminals in the terminal group, and determines the first session management function entity based on the session management function entities accessed by the terminals.

In an implementation, the policy control function entity may determine the first session management function entity based on a quantity of terminals in the terminal group that are served by each of the session management function entities corresponding to the terminals in the terminal group.

In an implementation, the policy control function entity sends second instruction information to the first session management function entity. The second instruction information is used to instruct the first session management function entity to select a user plane function entity used by a second terminal in the terminal group to perform communication, and the second terminal is a terminal that is in the terminal group and that corresponds to the first session management function entity.

In an implementation, the policy control function entity sends a notification message to a target network element. The notification message includes the information of the terminal group and address information of the first session management function entity, and the notification message is used to instruct the target network element to insert the first session management function entity into a session of a third terminal in the terminal group, and instruct the first session management function entity to select a user plane function entity used by the third terminal to perform communication. The target network element is a second session management function entity or an access and mobility management function entity, and the third terminal is a terminal that is in the terminal group and that corresponds to the target network element. Optionally, any two, any three, or all of the user plane function entity, the session management function entity, the access and mobility management function entity, and the policy control function entity in FIG. 1(*a*) may be implemented by one entity device, or may be jointly implemented by a plurality of entity devices, or may be one logical function module in one entity device. This is not specifically limited in this embodiment of this application.

It should be noted that a communication method according to an embodiment of this application may be performed by an apparatus. The apparatus may be a session management function entity or a chip in the session management function entity, or may be a policy control function entity or a chip in the policy control function entity.

In a fifth-generation (5G) mobile communications technology, the session management function entity is also referred to as an SMF (session management function) entity, the user plane function entity is also referred to as a UPF (user plane function), the policy control function entity is also referred to as a PCF (policy control function) entity, and the access and mobility management function entity is also referred to as an AMF (Access and Mobility Management Function) entity. In future communication, the session management function entity, the policy control function entity, and the access and mobility management function entity may have other names.

For ease of description, in this application, the communication method is described by using an example in which the apparatus is the session management function entity or the policy control function entity. For an implementation method when the apparatus is the chip in the session management function entity or the chip in the policy control function entity, refer to specific descriptions of the communication method performed by the session management function entity or the policy control function entity. No repeated description is provided.

In this application, a method of communication between terminals in a terminal group is described. Terminals in one terminal group may be represented by terminal identifiers of the terminals, and the terminal group includes at least two terminals. In specific application, each terminal in the terminal group may be, for example, a communications apparatus in one vehicle in a platoon. In other words, each vehicle in the platoon has one communications apparatus. A set of communications apparatuses in all vehicles forms one terminal group. Communication between terminals in the terminal group may be used to indicate communication between vehicles in the platoon.

Certainly, in another application scenario, the terminals in the terminal group may further have other meanings. For example, a set including a plurality of control units in a factory may also be referred to as one terminal group. A specific application scenario of the terminals in the terminal group is not limited in this application.

Figure 1B:
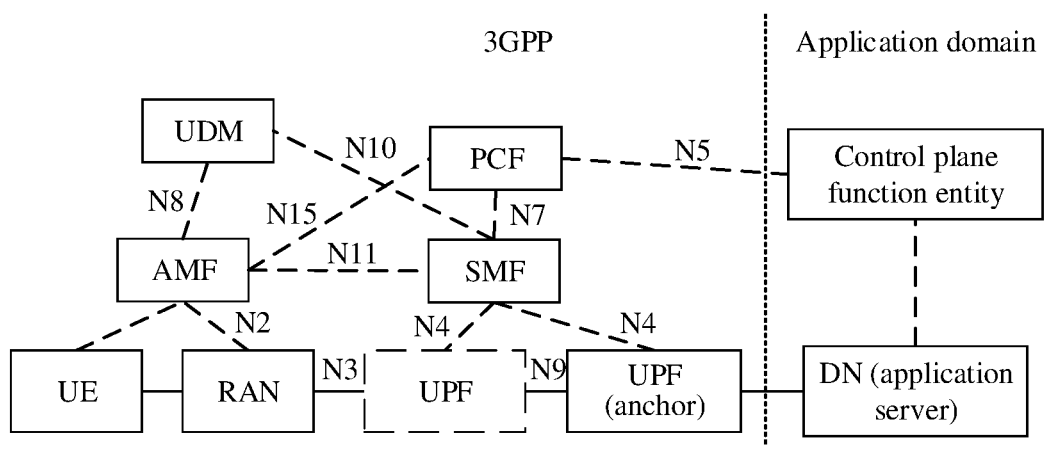
FIG. 1(b) is a schematic diagram of a possible network architecture according to an embodiment of this application.

FIG. 1(b) is a schematic diagram of a possible network architecture according to an embodiment of this application. The network architecture is a 5G network architecture. Network elements in the 5G architecture include an AMF entity, an SMF entity, and a user plane function UPF entity, and may further include a PCF entity, a terminal (an example in which the terminal is user equipment (UE) and is used in the figure), a radio access network (Radio Access Network, RAN), a unified data management (UDM) entity, and the like. In an application domain, the network elements in the 5G architecture include a control plane function entity and an application server. The control plane function entity is mainly responsible for terminal authentication, application server management, interaction with a control plane on a network side, and the like. The application server is mainly responsible for providing service authentication and a specific service for a terminal. For example, in vehicle-to-everything communication, the control plane function entity may be a vehicle-to-everything communication control function (V2X Control Function) entity, and the application server may be a vehicle-to-everything communication application server (V2X Application Server), and may be configured to perform remote driving, traffic information distribution, and the like.

The RAN device communicates with the AMF entity through an N2 interface. The RAN device communicates with the UPF entity through an N3 interface. The UPF entity communicates with the SMF entity through an N4 interface. The PCF entity communicates with the control plane control entity through an N5 interface. The SMF entity communicates with the PCF entity through an N7 interface. The AMF entity communicates with the UDM entity through an N8 interface. The UPF entity communicates with the UPF entity through an N9 interface. The SMF entity communicates with the UDM entity through an Mo interface. The AMF entity communicates with the SMF entity through an Nil interface. The AMF entity communicates with the PCF entity through an N15 interface.

A main function of the RAN is to control a user to access a mobile communications network wirelessly. The RAN is a part of a mobile communications system, and implements a radio access technology. Conceptually, the RAN resides on a device (such as a mobile phone, a computer, or any remote control machine), and provides a connection to a core network. The RAN device includes but is not limited to: a gNodeB (gNB) in 5G, an evolved NodeB (eNB), a radio network controller (RNC), a NodeB (NB), a base station controller (BSC), a base transceiver station (BTS), a home base station (for example, a home evolved nodeB or a home node B, HNB), a baseband unit (BBU), a transmission reception point (TRP), a transmission point (TP), a mobile switching center, and the like. In addition, the RAN device may further include a wireless fidelity (Wi-Fi) access point (AP) and the like.

The AMF entity is responsible for access management and mobility management of the terminal. In actual application, the AMF entity includes a mobility management function in a mobility management entity (MME) in a network framework in long term evolution (LTE), and further has an access management function.

The SMF entity is responsible for session management, for example, session establishment of the user.

The UPF entity is a user plane function network element, and is mainly responsible for accessing an external network. The UPF entity includes related functions of a serving gateway (SGW) and a public data network gateway (PDN-GW) in LTE.

The UDM entity may store subscription information of the user, and implement a backend similar to a home subscriber server (HSS) in 4G.

The PCF entity is configured to perform policy control, and is similar to a policy and charging rules function (PCRF) unit in 4G. The PCF entity is mainly responsible for generating policy authorization, quality of service (QoS), and a charging rule, and delivering a corresponding rule to the UPF entity by using the SMF entity, to complete installation of the corresponding policy and rule.

The terminal in this application is a device having wireless receiving and sending functions, and may be deployed on land, for example, an indoor or outdoor device, a handheld device, or a vehicle-mounted device, or may be deployed on water (for example, on a steamship), or may be deployed in the air (for example, on an airplane, a balloon, or a satellite). The terminal may be a mobile phone, a tablet computer (pad), a computer having wireless receiving and sending functions, a virtual reality (VR) terminal, an augmented reality (AR) terminal, a wireless terminal in industrial control, a wireless terminal in self driving, a wireless terminal in remote medical, a wireless terminal in smart grid, a wireless terminal in transportation safety, a wireless terminal in smart city, a wireless terminal in smart home, or the like. For example, UE in FIG. 1(b) is a specific example of the terminal.

It should be noted that a RAN device, an SMF entity, a UPF entity, an AMF entity, a PCF entity, a UDM entity, and the like in FIG. 1(b) are merely names, and the names constitute no limitation on the devices. In a 5G network and another future network, network elements or entities corresponding to the RAN device, the SMF entity, the UPF entity, the AMF entity, the PCF entity, and the UDM entity may have other names. This is not specifically limited in this embodiment of this application.

For ease of description, in this application, a system architecture shown in FIG. 1(b) is used as a specific embodiment to describe the solutions of this application.

For the system architecture shown in FIG. 1(b), one SMF entity may manage a plurality of UPF entities, and a set of service ranges of the plurality of UPF entities is a service range of the SMF entity. That the SMF entity manages the plurality of UPF entities may also be referred to as that the SMF entity corresponds to the plurality of UPF entities.

For terminals in a terminal group, after sessions such as a packet data unit (PDU) sessions of the terminals are established, each of user plane paths of the terminals includes one or more UPF entities. In this case, these UPF entities may be accessed by the terminals, or may be referred to as UPF entities corresponding to the terminals, or may be referred to as UPF entities on session paths of the terminals, or may be referred to as UPF entities serving the terminals, which all represent a same meaning. Different representation manners are alternately used subsequently in this application.

After the sessions of the terminals are established, each of control plane paths of the terminals includes one or more SMF entities. These SMF entities may be referred to as SMF entities configured to manage the terminals, or may be referred to as SMF entities on the control plane paths of the sessions of the terminals, or may be referred to as SMF entities corresponding to the terminals, or may be referred to as SMF entities serving the terminals, which all represent a same meaning. Different representation manners are alternately used subsequently in this application.

Currently, according to a prior-art solution, when terminals in a terminal group communicate with each other, communication data needs to pass through all UPF entities on user plane paths of terminals.

For example, for UE 1 and UE 2 in the terminal group, if UPF entities included on a user plane path of a terminal 1 are a UPF 1 and a UPF 2, a RAN 1 is a base station accessed by the UE 1, and the UPF 1 is a UPF connected to the RAN 1. If UPF entities included on a user plane path of the UE 2 are a UPF 3 and a UPF 4, the RAN 1 is a base station accessed by the UE 2, and the UPF 3 is a UPF connected to a RAN 2.

According to a prior-art communication method, a path through which communication data between a terminal 1 and a terminal 2 passes is as follows:

Terminal 1→RAN 1→UPF 1→UPF 2→data network (DN)→UPF 4→UPF 3→RAN 2→terminal 2.

It can be learned that, when there are a plurality of UPF entities on a user plane path of the terminal 1, or there are a plurality of UPF entities on a user plane path of the terminal 2, communication between the terminal 1 and the terminal 2 needs to pass through each UPF entity on the user plane path. Consequently, a path of the communication data is prolonged, and a relatively great latency between terminals is caused.

To resolve the foregoing and/or other problems, this application provides a communication method which is applicable to the system architectures shown in FIG. 1(*a*) and FIG. 1(*b*). The communication method can reduce a latency of communication between terminals in a terminal group.

For ease of description, an example in which the session management function entity is an SMF entity, the policy control function entity is a PCF entity, and the user plane function entity is a UPF entity is used for description in this application.

Figure 2:
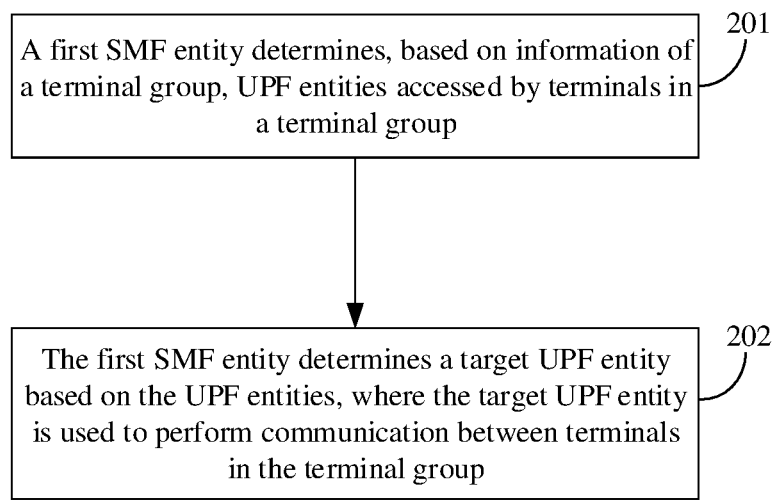
FIG. 2 is a schematic diagram of a communication method according to an embodiment of this application.

The following specifically describes the communication method in this application. FIG. 2 shows a communication method according to an embodiment of this application. The communication method includes the following steps.

Step 201: A first SMF entity determines, based on information of a terminal group, UPF entities accessed by terminals in a terminal group.

The first SMF entity is an SMF entity configured to select a target UPF entity. For example, when SMF entities corresponding to the terminals in the terminal group are a same SMF entity, the SMF entity is the first SMF entity.

For another example, when SMF entities corresponding to the terminals in the terminal group are a plurality of SMF entities, a PCF entity selects one SMF entity from the plurality of SMF entities to serve as the first SMF entity.

For another example, an SMF entity other than SMF entities corresponding to the terminal group may be selected as the first SMF entity. In other words, the selected first SMF entity is not in the SMF entities corresponding to the terminals in the terminal group.

The information of the terminal group includes at least identifiers of the terminals in the terminal group, and optionally, further includes an identifier of the terminal group. The information of the terminal group may be from the PCF entity, or may be from another SMF entity, or may be from an AMF entity. Descriptions are separately provided subsequently based on different cases.

The first SMF entity may obtain at least session contexts such as PDU session contexts of the terminals in the terminal group based on the information of the terminal group. A UPF entity accessed by a terminal served by the first SMF entity may be obtained based on the session contexts of the terminals.

For example, the terminal group includes UE 1, UE 2, and UE 3. The UE 1 corresponds to a UPF 1, the UE 2 corresponds to a UPF 2, and the UE 3 corresponds to a UPF 3. The UPF 1 and the UPF 2 are UPF entities covered by the first SMF entity, and the UPF 3 is a UPF entity that is not covered by the first SMF entity. In this case, the first SMF entity obtains the UPF 1 and the UPF 2 based on the contexts of the terminals, in other words, determines that the UPF entities accessed by the terminals in the terminal group are {UPF 1, UPF 2}.

Step 202: The first SMF entity determines a target UPF entity based on the UPF entities.

The target UPF entity is configured to perform communication between terminals in the terminal group. The communication herein is local communication, and may also be understood as closed-loop communication. To be specific, after receiving communication data from a first terminal, the target UPF entity sends, by using local routing information, the communication data to a base station accessed by a second terminal or to a UPF entity accessed by the second terminal, instead of sending the communication data to another UPF entity accessed by the first terminal or to a DN (definition network) like in the prior art.

For example, for UE 1 and UE 2 in the terminal group, if UPF entities included on a user plane path of a terminal 1 are a UPF 1 and a UPF 2, a RAN 1 is a base station accessed by the UE 1, and the UPF 1 is a UPF connected to the RAN 1. If UPF entities included on a user plane path of the UE 2 are a UPF 3 and a UPF 4, the RAN 1 is a base station accessed by the UE 2, and the UPF 3 is a UPF connected to a RAN 2.

According to a prior-art communication method, a path through which communication data between a terminal 1 and a terminal 2 passes is as follows:

UE 1→RAN 1→UPF 1→UPF 2→DN→UPF 4→UPF 3→RAN 2→UE 2.

However, according to the communication method in this application, if the UPF 1 is selected as the target UPF entity, a path through which communication data between the UE 1 and the UE 2 passes may be as follows:

UE 1→RAN 1→UPF 1 (target UPF)→RAN 2→UE 2.

Alternatively, a path through which communication data between the UE 1 and the UE 2 passes may be as follows: UE 1→RAN 1→UPF 1 (target UPF)→UPF 3→RAN 2→UE 2.

Alternatively, a path through which communication data between the UE 1 and the UE 2 passes may be as follows: UE 1→RAN 1→UPF 1 (target UPF)→UPF 4→UPF 3→RAN 2→UE 2.

A specific manner to be used may be determined based on an actual requirement. Preferably, the first implementation method may be used, in other words, UE 1→RAN 1→UPF 1 (target UPF)→RAN 2→UE 2.

It should be noted that the RAN 1 and the RAN 2 may be a same RAN, or may be different RANs. This is not limited.

In the foregoing several updated paths provided in this application, regardless of a specific path to be used, compared with the prior art, a forwarding path of communication data between terminals is shortened. Particularly, for the foregoing first implementation method, the terminals in the terminal group are redirected to a same UPF entity, namely, the target UPF entity, so that communication between terminals in the terminal group is locally implemented in the target UPF entity. This shortens a communication path, and reduces a communication latency.

The following provides descriptions with reference to specific examples based on different cases.

Case 1: The terminals in the terminal group access a same UPF entity, and correspond to a same SMF entity.

In the case 1, when all the terminals in the terminal group correspond to a same SMF entity, in other words, are managed by a same SMF entity, the PCF entity determines that the SMF entity is the first SMF entity. The PCF entity sends first instruction information to the first SMF entity. The first instruction information is used to instruct the first SMF entity to select a UPF entity used by a terminal in the terminal group to perform communication. The instruction information carries the information of the terminal group. The information of the terminal group includes identifiers of the terminals in the terminal group, and optionally, further includes an identifier of the terminal group.

When all the terminals in the terminal group access a same UPF entity, the first SMF entity determines that the UPF entity is the target UPF entity.

Figure 3:
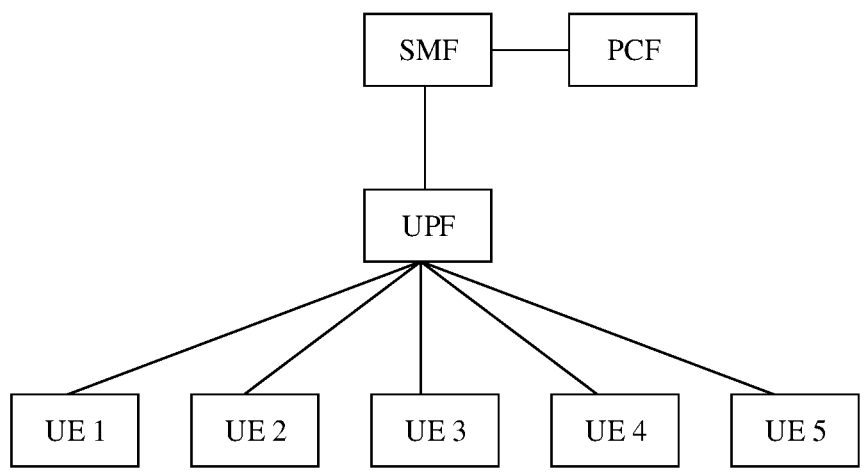
FIG. 3 is a schematic diagram of a UPF and an SMF corresponding to terminals in a terminal group according to an embodiment of this application.

FIG. 3 is a schematic diagram of a UPF and an SMF corresponding to terminals in a terminal group according to an embodiment of this application. The terminal group includes five terminals, which are respectively UE 1, UE 2, UE 3, UE 4, and UE 5. In addition, the five terminals access a same UPF entity on a user plane path, and are managed by a same SMF entity on a control plane path.

In this example, the PCF entity determines that the SMF entity is the first SMF entity, and the first SMF entity determines that the UPF entity is the target UPF entity.

Further, in an implementation, the first SMF entity further creates local routing information, and sends the local routing information to the target UPF entity. The local routing information is used to record an association relationship between a downlink tunnel of each terminal in the terminal group and the terminal, so that the target UPF entity can forward communication data of a source terminal to a destination terminal based on the local routing information. The communication data includes address information of the destination terminal.

Certainly, in another implementation, if the target UPF entity has a local routing capability, the first SMF entity does not need to send local routing information to the target UPF entity, but only needs to send instruction information to the target UPF entity, to instruct the target UPF entity to perform local routing. In this way, communication data of a source terminal can also be directly forwarded to a destination terminal.

In another implementation, if the target UPF entity has a local routing capability, the first SMF entity may send neither local routing information nor instruction information to the target UPF entity. In other words, the target UPF entity has a local communication capability.

In any one of the foregoing implementations, optionally, the first SMF entity may send information such as some charging rules to the target UPF entity.

Case 2: The terminals in the terminal group access different UPF entities, and correspond to a same SMF entity.

In the case 2, when all the terminals in the terminal group correspond to a same SMF entity, in other words, are managed by a same SMF entity, the PCF entity determines that the SMF entity is the first SMF entity.

After determining the first SMF entity, the PCF entity sends first instruction information to the first SMF entity. The first instruction information is used to instruct the first SMF entity to select a UPF entity used by a terminal in the terminal group to perform communication. In other words, the PCF entity instructs, by using the first instruction information, the first SMF entity to select the target UPF entity.

In the case 2, because the terminals in the terminal group access different UPF entities, the first SMF entity needs to select one UPF entity from these UPF entities to serve as the target UPF entity. Certainly, the first SMF entity may select the target UPF entity from other UPF entities.

The first SMF entity may select the target UPF entity from UPF entities accessed by the terminals in the terminal group or other UPF entities based on one or more of the following factors: a factor 1, a factor 2, and a factor 3.

The factor 1 is a service range of each of the UPF entities accessed by the terminals and locations of the terminals in the terminal group.

The factor 2 is a quantity of terminals in the terminal group that are served by each of the UPF entities accessed by the terminals.

The factor 3 is a load of each of the UPF entities accessed by the terminals.

Figure 4:
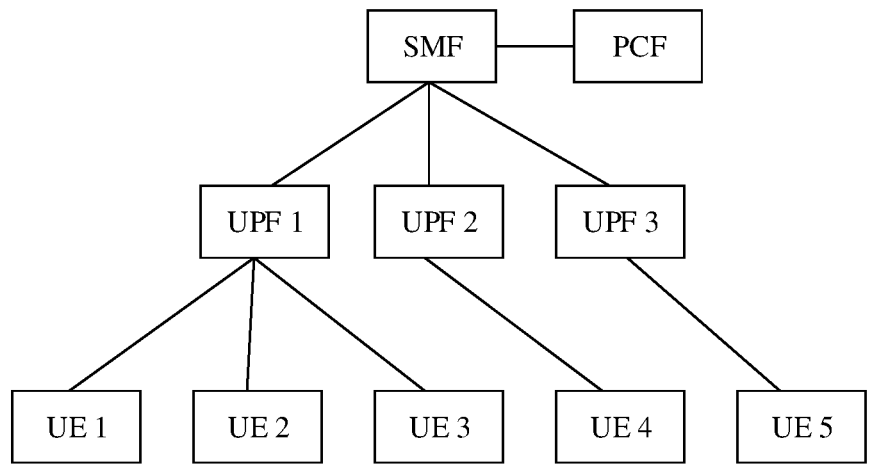
FIG. 4 is another schematic diagram of a UPF and an SMF corresponding to terminals in a terminal group according to an embodiment of this application.

FIG. 4 is a schematic diagram of a UPF and an SMF corresponding to terminals in a terminal group according to an embodiment of this application. The terminal group includes five terminals, which are respectively UE 1, UE 2, UE 3, UE 4, and UE 5. In addition, the UE 1 to the UE 3 access a UPF 1, the UE 4 accesses a UPF 2, and the UE 5 accesses a UPF 3 on a user plane path, and the UE 1 to the UE 5 are all managed by a same SMF entity on a control plane path.

With reference to the example shown in FIG. 4, for the factor 1, the target UPF entity may be selected based on the relation between a service range of each of the UPF 1 to the UPF 3 and a location of each of the UE 1 to the UE 5, for example, whether the UE is comparatively close to a central location of the service range of the UPF entity. A shorter distance indicates a lower probability that the UPF entity is moved out. Generally, if a distance between every two of the terminals in the terminal group is relatively short, the terminals in the terminal group may be used as a whole physically, and a UPF entity is selected based on a physical location relationship between the terminal group and the UPF entity. Specifically, if the terminal group is closer to a central location of the UPF entity, it is more likely to select the UPF entity.

With reference to the example shown in FIG. 4, for the factor 2, the target UPF may be selected based on the quantity of terminals in the terminal group that are served by each UPF entity. For example, a UPF entity that serves a largest quantity of terminals is selected as the target UPF entity. For FIG. 4, if the UPF 1 serves three terminals, the UPF 2 serves one terminal, and the UPF 3 serves one terminal, the UPF 1 is preferentially selected as the target UPF entity.

With reference to the example shown in FIG. 4, for the factor 3, the target UPF may be selected based on the load of each of the UPF entities accessed by the terminals. For example, a UPF entity having a lowest load is selected as the target UPF entity.

The target UPF entity may be specifically selected based on one or more of the foregoing factors. The target UPF may be a UPF entity in the UPF entities accessed by the terminals in the terminal group, or may be a UPF entity other than the UPF entities accessed by the terminals in the terminal group. The UPF entity is also managed by the first SMF entity. For example, another UPF entity may be selected when a comparatively good UPF entity cannot be selected from the UPF entities accessed by the terminals in the terminal group, based on the foregoing factors.

For the example shown in FIG. 4, the UPF 1 is finally selected as the target UPF entity. In this case, when every two of the UE 1 to the UE 5 need to communicate with each other, local forwarding may be performed by using the UPF 1. For example, if the UE 1 sends communication data to the UE 4, a communication path of the communication data may be: UE 1→RAN 1→UPF 1→RAN 2→UE 4. In the prior art, the communication path of the communication data is: UE 1→RAN 1→UPF 1→DN→UPF 2→RAN 2→UE 4. Apparently, the method in this application can shorten a transmission path of communication data, and can reduce a latency.

Case 3: The terminals in the terminal group access different UPF entities, and correspond to different SMF entities.

In the case 3, when the terminals in the terminal group correspond to different UPF entities, the PCF entity may select one SMF entity from these SMF entities to serve as the first SMF entity.

For example, the PCF entity may obtain the information of the terminal group. The information of the terminal group includes at least the identifiers of the terminals in the terminal group, and optionally, further includes the identifier of the terminal group. The identifier of the terminal group is used to identify the terminal group, and the identifiers of the terminals are used to identify the terminals.

Specifically, the PCF entity may receive the information of the terminal group from a control plane function entity or an application server. The information of the terminal group in the control plane function entity or the application server may be generated when the control plane function entity or the application server establishes the terminal group, or may be sent to the control plane function entity or the application server after a specific terminal in the terminal group establishes the terminal group.

Figure 5:
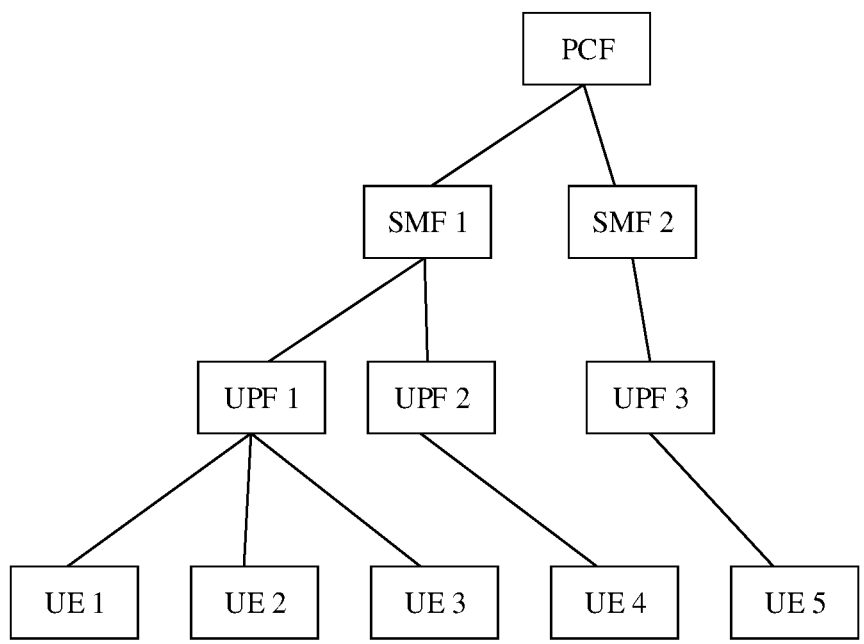
FIG. 5 is another schematic diagram of a UPF and an SMF corresponding to terminals in a terminal group according to an embodiment of this application.

After obtaining the information of the terminal group, the PCF entity may determine the first SMF entity based on the identifiers of the terminals in the terminal group. For example, the PCF entity determines, based on the identifiers of the terminals in the terminal group by using contexts corresponding to the terminal identifiers, an SMF entity corresponding to each terminal. For example, FIG. 5 is a schematic diagram of a UPF and an SMF corresponding to terminals in a terminal group according to an embodiment of this application. The terminal group includes five terminals, which are respectively UE 1, UE 2, UE 3, UE 4, and UE 5. In addition, the UE 1 to the UE 3 access a UPF 1, the UE 4 accesses a UPF 2, and the UE 5 accesses a UPF 3 on a user plane path, and the UE 1 to the UE 4 correspond to an SMF 1, and the UE 5 corresponds to an SMF 2 on a control plane path. Therefore, it may be determined that SMF entities corresponding to the terminals in the terminal group are the SMF 1 and the SMF 2.

Then, an SMF entity is selected from the SMF 1 and the SMF 2 to serve as the first SMF entity. Before the first SMF entity is selected, in an implementation, the PCF entity determines the first SMF entity based on a quantity of terminals in the terminal group that are served by each of SMF entities corresponding to the terminals in the terminal group. For example, for FIG. 5, if terminals served by the SMF 1 are the UE 1 to the UE 4, namely, four terminals, and terminals served by the SMF 2 are the UE 5, namely, one terminal, the SMF 1 is selected as the first SMF. Certainly, in specific application, the first SMF entity may be selected according to another method. For example, an SMF entity other than the SMF entities corresponding to the terminal group may be selected as the first SMF entity. In other words, the selected first SMF entity is not in the SMF entities corresponding to the terminals in the terminal group. This is not specifically limited in this application.

After determining the first SMF entity, the PCF entity may determine, based on information about the terminals in the terminal group, a method for instructing the first SMF entity to select a UPF entity configured to perform communication between terminals in the terminal group. For example, there are at least the following two instruction methods.

Instruction method 1: The PCF entity sends second instruction information to the first SMF entity, and then sends a notification message to a target network element.

The target network element is an AMF entity or a second SMF entity.

The second SMF entity is an SMF entity in the SMF entities corresponding to the terminals in the terminal group other than the first SMF entity. For example, referring to FIG. 5, if the SMF 1 is the first SMF entity, the SMF 2 is the second SMF entity.

Specifically, the PCF entity first sends the second instruction information to the first SMF entity. The second instruction information is used to instruct the first SMF entity to select a UPF entity used by a second terminal in the terminal group to perform communication. The second terminal is a terminal that is in the terminal group and that is managed by the first SMF entity, or the second terminal may be understood as a terminal that is in the terminal group and that corresponds to the first SMF entity. With reference to FIG. 5, the second terminal is any one of the UE 1 to the UE 4.

Because the first SMF entity manages some terminals, the first SMF entity may select a target UPF entity for the terminals managed by the first SMF entity. For example, the first SMF entity selects the UPF 1 as the target UPF entity.

After selecting the target UPF entity, the first SMF entity stores the target UPF entity. A storage method includes but is not limited to the following methods.

Storage method 1: The target UPF entity and the identifier of the terminal group are stored in the session contexts of the terminals in the terminal group.

For example, the target UPF entity is the UPF 1, and the session contexts of the terminals are as follows:

A session context of the UE 1 includes the identifier of the terminal group and an identifier of the UPF 1.

A session context of the UE 2 includes the identifier of the terminal group and the identifier of the UPF 1.

A session context of the UE 3 includes the identifier of the terminal group and the identifier of the UPF 1.

A session context of the UE 4 includes the identifier of the terminal group and the identifier of the UPF 1.

A session context of the UE 5 includes the identifier of the terminal group and the identifier of the UPF 1.

For another example, the session contexts of the terminals may be as follows:

A session context of the UE 1 includes the identifier of the terminal group and address information of the UPF 1.

A session context of the UE 2 includes the identifier of the terminal group and address information of the UPF 1.

A session context of the UE 3 includes the identifier of the terminal group and address information of the UPF 1.

A session context of the UE 4 includes the identifier of the terminal group and address information of the UPF 1.

A session context of the UE 5 includes the identifier of the terminal group and address information of the UPF 1.

Storage method 2: A correspondence between the target UPF entity and the identifier of the terminal group is locally stored.

The first SMF entity locally stores a correspondence between the identifier of the UPF 1 and the identifier of the terminal group, for example, in a form of a table or a function mapping relationship. This is not limited in this application.

After sending the second instruction information to the first SMF entity, the PCF entity further sends a notification message to a target network element. The notification message includes the information of the terminal group and address information of the first SMF entity, and the notification message is used to instruct the target network element to insert the first SMF entity into a session of a third terminal in the terminal group, and instruct the first SMF entity to select a UPF entity used by the third terminal to perform communication.

For example, referring to FIG. 5, if the target network element is the second SMF entity, the SMF 2 in FIG. 5 is the second SMF entity. Certainly, if the terminals in the terminal group further correspond to the SMF 3 and the SMF 4, the SMF 3 and the SMF 4 are also referred to as second SMF entities. In other words, the second SMF entities include the SMF 3 and the SMF 4.

The PCF entity sends a notification message to the SMF 2. The notification message includes address information of the SMF 1 (the first SMF entity) and the information of the terminal group. Optionally, the notification message further includes instruction information. The instruction information needs to be sent by the SMF 2 to the SMF 1, and is used to instruct the SMF 1 to select a UPF entity used by a third terminal in the terminal group to perform communication. Certainly, the notification message may alternatively not include the instruction information, but implicitly gives an instruction. Details are described below.

The third terminal is a terminal that is in the terminal group and that is served by the second SMF entity. In FIG. 5, the third terminal is the UE 5.

After receiving the foregoing information, the SMF 2 inserts the SMF 1 into a session of the UE 5, for example, a PDU session of the UE 5. In addition, the SMF 2 further sends a first request message to the SMF 1. The first request message is used to request the SMF 1 to select a UPF entity used by the third terminal, namely, the UE 5, in the terminal group to perform communication.

Optionally, if the notification message received by the SMF 2 from the PCF entity includes instruction information, the SMF 2 adds the instruction information to the first request message, and then sends the first request message to the SMF 1. If the notification message does not include instruction information, the SMF 2 directly adds the information of the terminal group to the first request message, and then sends the first request message to the SMF 1, to implicitly instruct the SMF 1 to select a UPF entity used by the third terminal to perform communication.

Herein, the information of the terminal group sent by the SMF 2 to the SMF 1 includes the identifier of the terminal group and an identifier of the third terminal in the terminal group, or the information of the terminal group sent by the SMF 2 to the SMF 1 includes the identifier of the terminal group and the identifiers of all the terminals in the terminal group.

After receiving the first request message from the SMF 2, the SMF 1 obtains, from the contexts of the terminals in the terminal group or from the locally stored correspondence between the target UPF entity and the identifier of the terminal group, the target UPF entity (namely, the UPF 1) selected by the SMF 1 entity for the second terminal (namely, the UE 1 to the UE 4), and then uses the target UPF entity as the target UPF entity of the third terminal (namely, the UE 5).

In other words, the SMF 1 selects the UPF 1 as the target UPF entity of the UE 1 to the UE 4 according to the instruction of the PCF entity, and then receives the first request message sent by the SMF 2. In this case, the SMF 1 directly uses the UPF 1 as the target UPF entity of the UE 5.

Certainly, if the target network element is the AMF entity, an implementation is similar. Details are not described again.

Instruction method 2: The PCF entity directly sends a notification message to a target network element.

In the instruction method, the PCF entity does not send second instruction information to the first SMF entity, but directly sends the notification message to the target network element. The notification message includes the information of the terminal group and address information of the first SMF entity, and the notification message is used to instruct the target network element to insert the first SMF entity into a session of a third terminal in the terminal group, and instruct the first SMF entity to select a UPF entity used by the third terminal to perform communication, or instruct the first SMF entity to select a UPF entity used by all the terminals in the terminal group to perform communication.

For example, referring to FIG. 5, an example in which the target network element is a second SMF entity is used. If the first SMF entity is the SMF 1 and the second SMF entity is the SMF 2, the PCF entity directly sends a notification message to the SMF 2. The notification message includes address information of the SMF 1 and the information of the terminal group. Optionally, the notification message further includes instruction information. The instruction information is used to instruct the SMF 1 to select a UPF entity used by the UE 1 to the UE 5 to perform group communication. Alternatively, the instruction information is used to instruct the SMF 1 to select a UPF entity used by the UE 5 to perform group communication.

After receiving the notification message from the PCF entity, the SMF 2 sends a second request message to the SMF 1. The second request message is used to request the SMF 1 to select a UPF entity used by the UE 5 in the terminal group to perform communication, or request the SMF 1 to select a UPF entity used by the UE 1 to the UE 5 in the terminal group to perform communication.

Optionally, if the notification message received by the SMF 2 from the PCF entity includes instruction information, the second request message includes the instruction information. If the notification message received by the SMF 2 from the PCF entity does not include instruction information, the SMF 2 directly adds the information of the terminal group to the second request message, and then sends the second request message to the SMF 1, to implicitly instruct the SMF 1 to select a UPF entity used by the UE 1 to the UE 5 to perform communication, or implicitly instruct the SMF 1 to select a UPF entity used by the UE 5 to perform communication.

Herein, the information of the terminal group sent by the SMF 2 to the SMF 1 includes the identifier of the terminal group and an identifier of the third terminal in the terminal group, or the information of the terminal group sent by the SMF 2 to the SMF 1 includes the identifier of the terminal group and the identifiers of all the terminals in the terminal group. After receiving the second request message from the SMF 2, the SMF 1 selects a target UPF entity for a terminal managed by the SMF 1 and a terminal managed by the SMF 2. For example, the SMF 1 selects the UPF 1 as the target UPF entity.

For a specific method for selecting the target UPF entity by the first SMF entity in the case 3, refer to the specific description of selecting the target UPF entity in the case 2. Details are not described herein again.

Therefore, after the target UPF entity is selected, communication between terminals in the terminal group is locally routed by using the UPF entity, so that a communication path can be shortened. This shortens a transmission path of communication data, and reduces a latency.

In the foregoing three cases, after selecting the target UPF entity used to perform communication between terminals in the terminal group, the first SMF entity further needs to update user plane tunnel information of some network elements. Descriptions are separately provided below.

For the case 1, the terminals in the terminal group correspond to a same UPF entity and a same SMF entity. In this case, the first SMF entity does not need to update tunnel information.

For the case 2, the terminals in the terminal group correspond to different UPF entities but a same SMF entity. In this case, the first SMF entity may send a first notification message to the target UPF entity. The first notification message includes tunnel information of a first terminal, and the first terminal indicates a terminal other than a terminal served by the target UPF entity. In other words, a UPF entity accessed by the first terminal is different from the target UPF entity. For example, referring to FIG. 4, if the UPF 1 is the target UPF entity, the first terminal is the UE 4 and the UE 5.

The tunnel information of the first terminal includes tunnel information of a base station accessed by the terminal or tunnel information of a UPF. Specifically, referring to FIG. 4, tunnel information of a base station accessed by the UE 4, tunnel information of a base station accessed by the UE 5, tunnel information of the UPF 2, and tunnel information of the UPF 3 are included.

In addition, the first SMF entity further sends a second notification message to the base station accessed by the first terminal. The second notification message includes the tunnel information of the target UPF entity. For example, referring to FIG. 4, a second notification message is further sent to the UE 4 and the UE 5, and the second notification message includes tunnel information of the UPF 1.

A path between different network elements may be established by updating tunnel information, so that the target UPF entity and the base station accessed by the first terminal can communicate with each other.

Optionally, a resource of the UPF entity accessed by the first terminal may be released. For example, resources of the UPF 2 and the UPF 3 are released.

For the foregoing case 3, in the instruction method 1, the first request message sent by the target network element to the first SMF entity further includes tunnel information of a base station accessed by the third terminal and/or tunnel information of a UPF entity accessed by the third terminal.

In the instruction method 2, the second request message sent by the target network element to the second SMF entity further includes tunnel information of a base station accessed by the third terminal and/or tunnel information of a UPF entity accessed by the third terminal.

For example, referring to FIG. 5, the first request message or the second request message sent by the SMF 2 to the SMF 1 further includes tunnel information of a base station accessed by the UE 5 and/or tunnel information of the UPF 3. After receiving the tunnel information, the SMF 1 sends the tunnel information of the base station accessed by the UE 5, the tunnel information of the UPF 3, tunnel information of a base station accessed by the UE 4, and tunnel information of the UPF 2 to the UPF 1 (the target UPF entity), so that the UPF 1 can update tunnel information. Further, the SMF 1 further sends tunnel information of the UPF 1 to the UE 4 and the UE 5, so that the UE 4 and the UE 5 can update tunnel information.

A path between different network elements may be established by updating the tunnel information, so that the target UPF entity and the base station accessed by the first terminal (the UE 4 and the UE 5) can communicate with each other.

In this application, the target UPF entity is determined, and the target UPF entity is used to perform local communication, which is also referred to as closed-loop communication between terminals in the terminal group, so that a communication path between the terminals in the terminal group can be shortened, and a communication latency can be reduced.

The solutions provided in this application are mainly described above from the perspective of interaction between network elements. It may be understood that, to implement the foregoing functions, each network element includes a corresponding hardware structure and/or software module for performing each of the functions. A person of ordinary skill in the art should easily be aware that, in combination with the examples described in the embodiments disclosed in this specification, units, algorithms steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

With reference to the accompanying drawings, the following further describes the communication method in this application by using specific embodiments.

The following embodiments are described by using an example in which the terminal group is a platoon. The terminals in the terminal group may also be referred to as platoon members, and the information of the terminal group may also be referred to as platoon information, which includes a platoon identifier and identifiers of the platoon members. In an application domain, the control function entity may be a V2X control function entity, and the application server may be a V2X application server. The target UPF entity may also be referred to as a serving UPF entity.

Establishment of the platoon may be initiated by UEs in the platoon, or may be initiated by a V2X control function (V2X-C) entity or a V2X application server (V2X-AS). If establishment of the platoon is initiated by the UE, the UE generates the platoon information, and sends the platoon information to the V2X-C or the V2X-AS. The platoon information includes at least the platoon identifier and the identifiers of the platoon members (namely, the UEs). If establishment of the platoon is initiated by the V2X-C or the V2X-AS, the V2X-C or the V2X-AS generates the platoon information. Certainly, establishment of the platoon may be jointly completed by the UE and the V2X-C and/or the UE and the V2X-AS. For example, the UE generates platoon member information, and then the V2X-C and/or the V2X-AS generates an identifier (ID) of each platoon member. This is not limited in the embodiments of this application.

Embodiment 1

Figure 6:
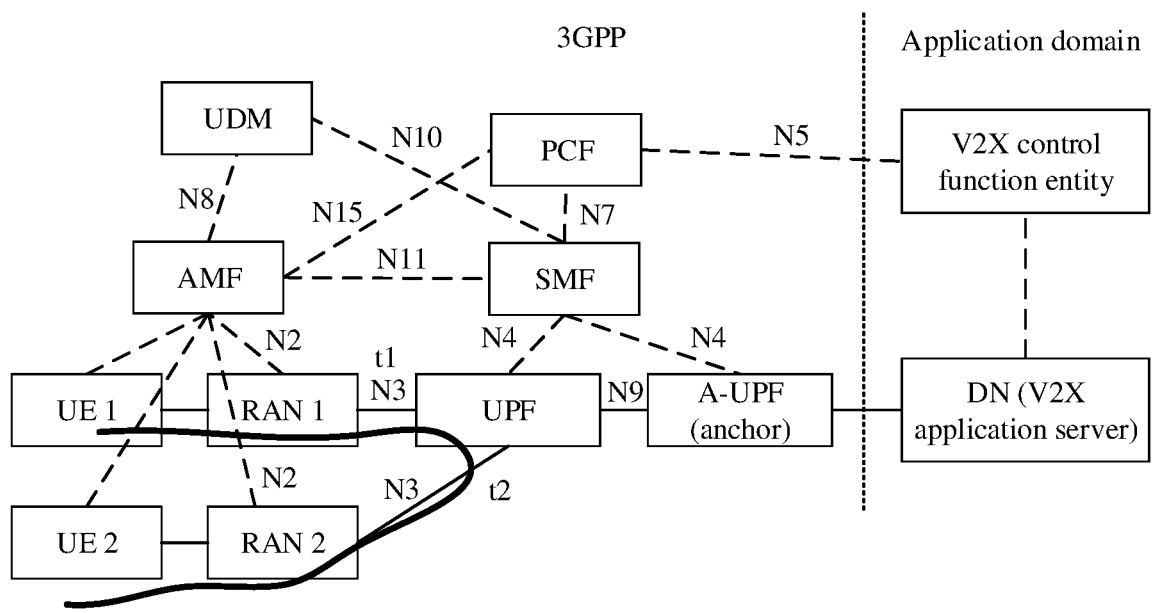
FIG. 6 is a schematic diagram of a network architecture to which Embodiment 1 is applicable.

A scenario of Embodiment 1 is as follows: UEs in a platoon member list belong to a same UPF and a same SMF. FIG. 6 is a schematic diagram of a network architecture to which Embodiment 1 is applicable. Two UEs, namely, UE 1 and UE 2, in the platoon member list are used as an example for description. In the scenario shown in FIG. 6, user plane paths of the UE 1 and the UE 2 each include a UPF and an A-UPF (anchor UPF).

Currently, according to a prior-art communication method, a flow direction of data sent by the UE 1 to the UE 2 is: UE 1→base station 1 (RAN 1)→UPF→A-UPF→V2XDN→A-UPF→UPF→RAN 2→UE 2.

Figure 7:
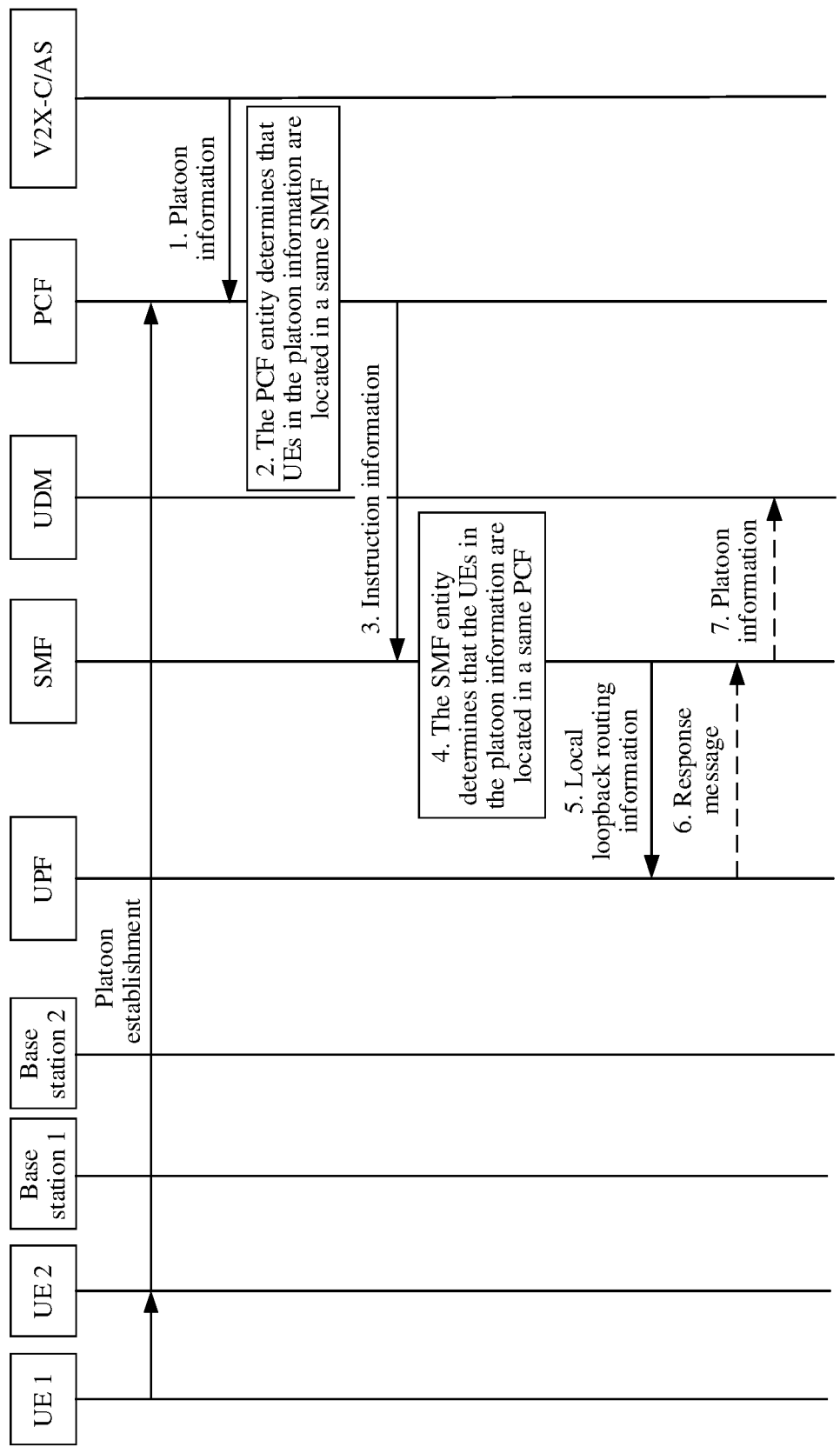
FIG. 7 is a schematic diagram of a communication method according to an embodiment of this application.

It can be learned from a current procedure of communication between UEs in the platoon that communication needs to pass through a relatively large quantity of network elements, and consequently a relatively great latency is caused. To resolve this problem, FIG. 7 shows a communication method according to an embodiment of this application. The communication method includes the following steps.

Step 1: V2X-C or V2X-AS sends platoon information to a PCF, and the PCF receives the platoon information from the V2X-C or the V2X-AS.

Step 2: The PCF determines that UEs in the platoon information are located in a same SMF.

The PCF locally obtains contexts of platoon members based on the received platoon information, and obtains, from the contexts of the platoon members, SMFs in which the UEs are located. In addition, the PCF determines that the SMFs in which the UEs are located are a same SMF.

Step 3: The PCF sends instruction information to the SMF, and the SMF receives the instruction information from the PCF.

The instruction information carries the platoon information, and the instruction information is used to instruct the SMF to select a serving UPF for the platoon. The SMF is the SMF that is determined in step 2 and in which the UEs are located.

Step 4: The SMF determines that the UEs in the platoon information are located in a same UPF.

The SMF locally obtains the contexts of the platoon members based on the platoon information, and obtains, from the contexts of the platoon members, UPFs in which the UEs are located. In addition, the SMF determines that the UPFs in which the UEs are located are a same UPF, and the SMF uses the UPF as the serving UPF.

Step 5: The SMF sends local loopback routing information to the UPF, and the UPF receives the local loopback routing information from the SMF.

The local loopback routing information includes a correspondence between each of the UEs in the platoon member list and a downlink tunnel. For example, Table 1 shows an example of representing the local loopback routing information in a form of a table.

TABLE 1

| Local loopback routing information | |
|---|---|
| Identifiers of the platoon members | Downlink tunnel |
| UE 1 | t1 |
| UE 2 | t2 |
| ... | ... |

Referring to FIG. 6, the tunnel t1 is a downlink tunnel between the UPF and the RAN 1, and the tunnel t2 is a downlink tunnel between the UPF and the RAN 2.

After receiving the local loopback routing information, the UPF subsequently forwards communication data between UEs by using the local loopback routing information. For example, when the UE 1 needs to send data to the UE 2, according to the communication method in this embodiment, a communication procedure is: UE 1→RAN 1→UPF→RAN 2→UE 2. The UPF is also referred to as a serving UPF.

Step 6: The UPF sends a response message to the SMF, and the SMF receives the response message from the UPF.

Step 6 is an optional step, and is performed to notify the SMF that the local loopback routing information is received.

Step 7: The SMF sends the platoon information to a UDM.

The UDM may store the received platoon information, so that another network element can use the platoon information.

Step 7 is an optional step, or step 7 may be performed in any step after step 3.

Therefore, according to the method in this embodiment, communication between UEs forms local communication in the serving UPF, so that a latency generated when data is transmitted from the UE 1 to the UE 2 can be reduced. This facilitates instant communication between platoon members.

Embodiment 2

Figure 8A:
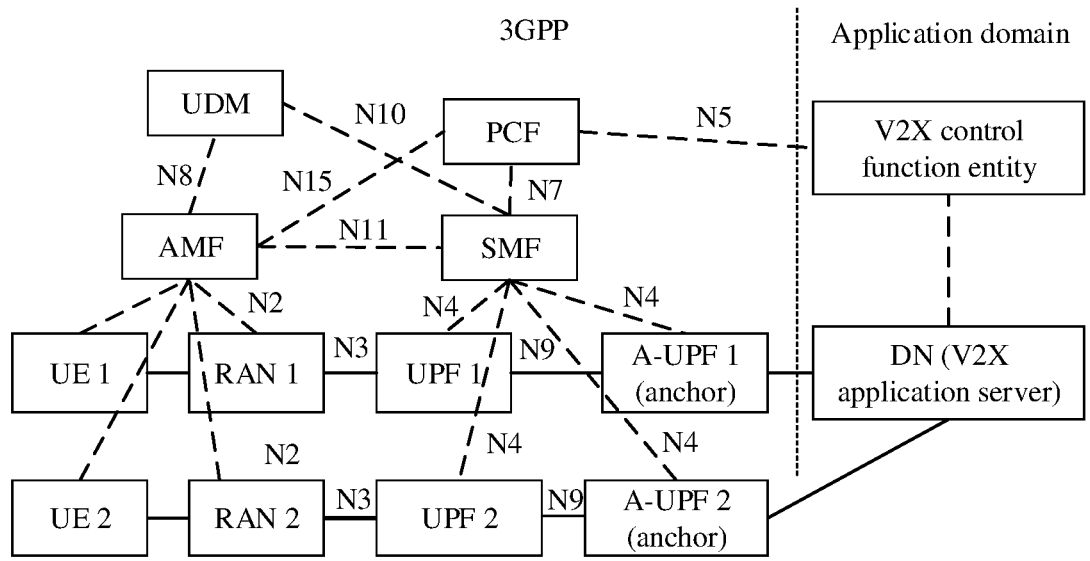
FIG. 8(a) is a schematic diagram of a network architecture to which Embodiment 2 is applicable.

A scenario of Embodiment 2 is as follows: Platoon members (UEs) in a platoon member list belong to different UPFs but a same SMF. FIG. 8(a) is a schematic diagram of a network architecture to which Embodiment 2 is applicable. Two UEs, namely, UE 1 and UE 2, in the platoon member list are used as an example for description. In the scenario shown in FIG. 8(a), a user plane path of the UE 1 includes a UPF 1 and an A-UPF 1 (anchor UPF), and a user plane path of the UE 2 includes a UPF 2 and an A-UPF 2 (anchor UPF). It may also be understood that the UE 1 belongs to the UPF 1, the A-UPF 1, and the SMF, and the UE 2 belongs to the UPF 2, the A-UPF 2, and the SMF.

Currently, according to a prior-art communication method, a flow direction of data sent by the UE 1 to the UE 2 is: UE 1→base station 1 (RAN 1)→UPF 1→A-UPF 1→V2XDN→A-UPF 2→UPF 2→base station 2 (RAN 2)→UE 2.

Figure 9:
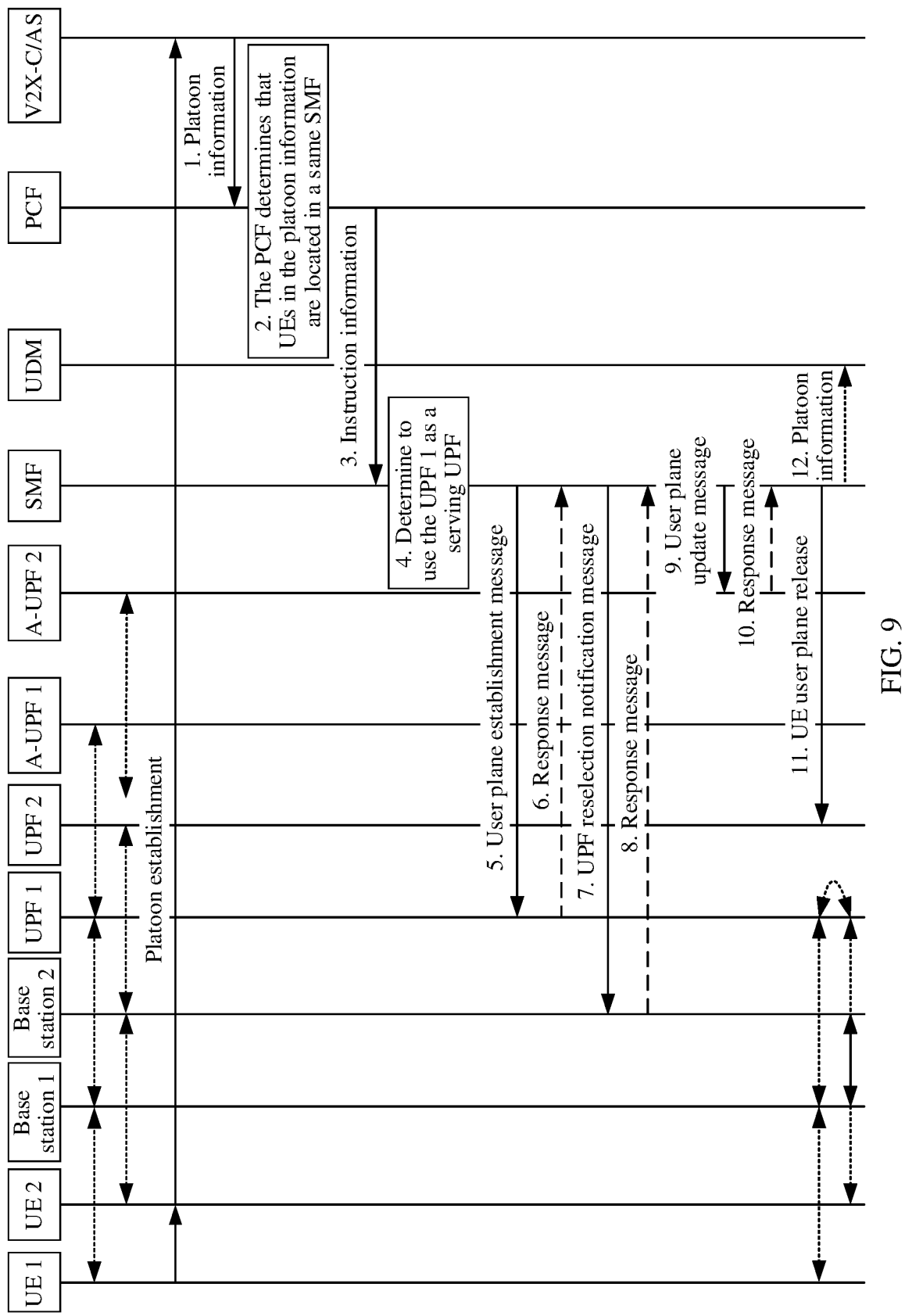
FIG. 9 is a schematic diagram of a communication method according to an embodiment of this application.

It can be learned from the foregoing procedure of communication between UEs that communication needs to pass through a relatively large quantity of network elements, and consequently a relatively great latency is caused. To resolve this problem, FIG. 9 shows a communication method according to an embodiment of this application. The communication method includes the following steps.

Step 1: V2X-C or V2X-AS sends platoon information to a PCF, and the PCF receives the platoon information from the V2X-C or the V2X-AS.

Step 2: The PCF determines that UEs in the platoon information are located in a same SMF.

The PCF locally obtains contexts of platoon members based on the received platoon information, and obtains, from the contexts of the platoon members, SMFs in which the UEs are located. In addition, the PCF determines that the SMFs in which the UEs are located are a same SMF.

Step 3: The PCF sends instruction information to the SMF, and the SMF receives the instruction information from the PCF.

The instruction information carries the platoon information, and the instruction information is used to instruct the SMF to select a serving UPF for the platoon. The SMF is the SMF that is determined in step 2 and in which the UEs are located.

Step 4: The SMF determines to use the UPF 1 as the serving UPF.

The SMF locally obtains the contexts of the platoon members based on the platoon information, and obtains, from the contexts of the platoon members, UPFs in which the UEs are located. Further, the SMF determines that the UE 1 belongs to the UPF 1 and the A-UPF 1, and determines that the UE 2 belongs to the UPF 2 and the A-UPF 2. In this case, the SMF selects a UPF from the UPF 1 and the UPF 2 to serve as the serving UPF.

For example, the serving UPF may be selected according to one or more of the following methods:

(1) A UPF with a lower load is selected as the serving UPF based on loads of UPFs on user plane paths of the UE 1 and the UE 2, namely, loads of the UPF 1 and the UPF 2.

(2) A UPF that serves a larger quantity of UEs in the platoon is selected as the serving UPF.

(3) A UPF closer to UE in the platoon is selected as the serving UPF.

Optionally, a new UPF may be selected as the serving UPF. The new UPF is a UPF other than the UEs in the platoon.

Herein, an example in which the UPF 1 is selected as the serving UPF is used for description.

Step 5: The SMF sends a user plane establishment message to the UPF 1, and the UPF 1 receives the user plane establishment message from the SMF.

The user plane establishment message includes user plane information of the UE 2, local loopback routing information, and tunnel information of the A-UPF 2. The user plane information of the UE 2 includes information about a tunnel from the UPF 1 to the RAN 2.

After the UPF 1 receives the user plane establishment message, the UPF 1 may obtain a path from the UPF 1 to the RAN 2 and a path from the UPF 1 to the A-UPF 2.

For content and a function of the local loopback routing information, refer to Table 1 in Embodiment 1. Details are not described herein again.

Step 6: The UPF 1 sends a response message to the SMF, and the SMF receives the response message from the UPF 1.

Step 6 is an optional step, and is performed to notify the SMF that a notification message is received.

Step 7: The SMF sends a UPF reselection notification message to the base station 2 (RAN 2), and the base station 2 (RAN 2) receives the UPF reselection notification message from the SMF.

The UPF reselection notification message includes tunnel information of a downlink user plane of the UPF 1 (which is a user plane of the UE 2). Therefore, the base station 2 (RAN 2) may obtain a path of the UPF 1, in other words, establish a user plane path from the base station 2 (RAN 2) to the UPF 1.

Step 8: The base station 2 (RAN 2) sends a response message to the SMF, and the SMF receives the response message from the base station 2 (RAN 2).

Step 8 is an optional step, and is performed to notify the SMF that the UPF reselection notification message is received.

Step 9: The SMF sends a user plane update message to the A-UPF 2, and the A-UPF 2 receives the user plane update message from the SMF.

The user plane update message is used to update user plane tunnel information, and the user plane update message carries tunnel information of an uplink user plane of the UPF 1. Therefore, a user plane path from the A-UPF 2 to the UPF 1 is established.

Step 10: The A-UPF 2 sends a response message to the SMF, and the SMF receives the response message from the A-UPF 2.

Step 10 is an optional step, and is performed to notify the SMF that the user plane update message is received.

Step 11: The SMF sends a UE user plane release message to the UPF 2, and the UPF 2 receives the UE user plane release message from the SMF.

After receiving the UE user plane release message, the UPF 2 releases information about a user plane tunnel between the UPF 2 and the RAN 2.

Step 12: The SMF sends the platoon information to a UDM.

The UDM may store the received platoon information, so that another network element can use the platoon information.

Step 12 is an optional step, or step 12 may be performed in any step after step 3.

Figure 8B:
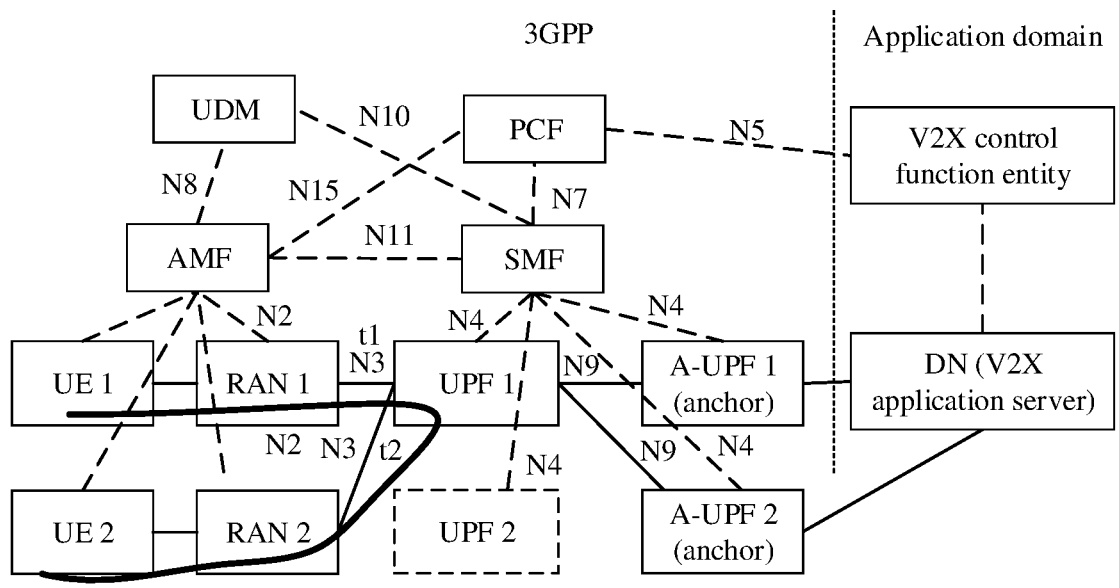
FIG. 8(b) is another schematic diagram of a network architecture to which Embodiment 2 is applicable.

According to the method in this embodiment, a network side may redirect the UEs in the platoon to a same UPF. The UPF is used as the serving UPF of the platoon, and communication between UEs in the platoon is locally implemented in the serving UPF. In this embodiment, the SMF determines to use the UPF 1 as the serving UPF of the platoon, to reselect a UPF for the UE 2, for example, the UPF 1 instead of the UPF 2. Therefore, after the UPF 1 is reselected for the UE 2, the system architecture shown in FIG. 8(a) is updated with the system architecture shown in FIG. 8(b). To be specific, the path between the RAN 2 and the UPF 1 and the path between the UPF 1 and the A-UPF 2 are established, and the path between the UPF 2 and the RAN 2 is released. Therefore, when the UE 1 needs to send data to the UE 2, according to the communication method in this embodiment, the communication procedure is: UE 1→RAN 1→UPF 1→RAN 2→UE 2. The UPF 1 is also referred to as the serving UPF. According to the method in this embodiment, a latency generated when the data is transmitted from the UE 1 to the UE 2 can be reduced. This facilitates instant communication between platoon members.

Embodiment 3

Figure 10A:
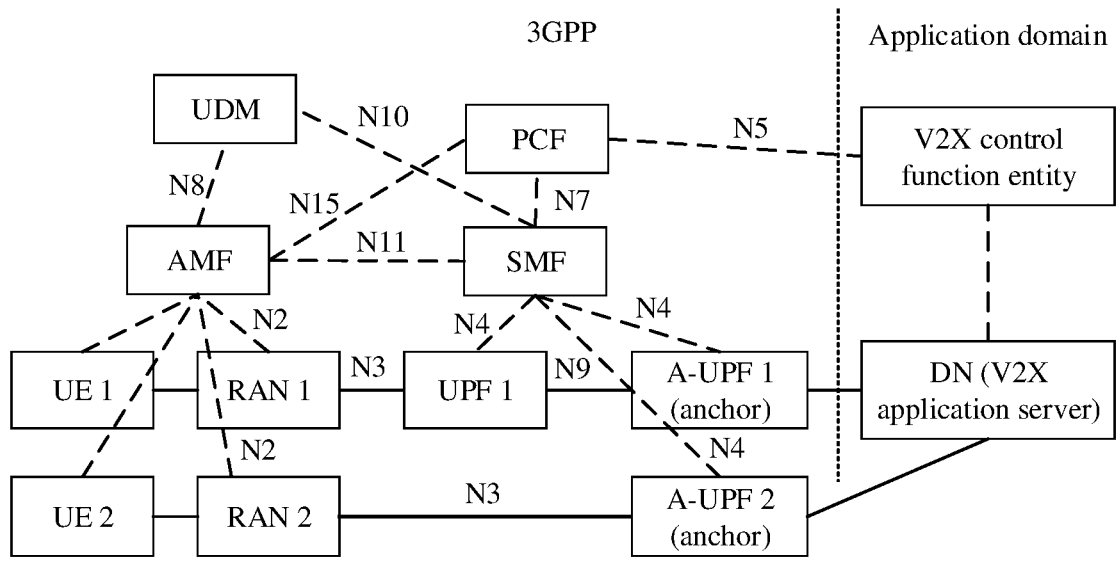
FIG. 10(a) is a schematic diagram of a network architecture to which Embodiment 3 is applicable.

A scenario of Embodiment 3 is as follows: UEs in a platoon member list belong to different UPFs but a same SMF. FIG. 10(a) is a schematic diagram of a network architecture to which Embodiment 3 is applicable. A main difference between this application scenario and the application scenario shown in FIG. 10(a) lies in as follows: In FIG. 10(a), there is only one UPF on a user plane of UE 2, namely, an anchor UPF, which is referred to as an A-UPF 2. When an SMF selects a UPF 1 as a serving UPF, a user plane tunnel of the anchor UPF cannot be released, in other words, the UPF 1 cannot be reselected for UE 2 and user plane tunnel information of the A-UPF 2 cannot be released according to the method in Embodiment 2. Therefore, in the scenario of Embodiment 3, a method for inserting the serving UPF may be used to complete UPF redirection.

Figure 10B:
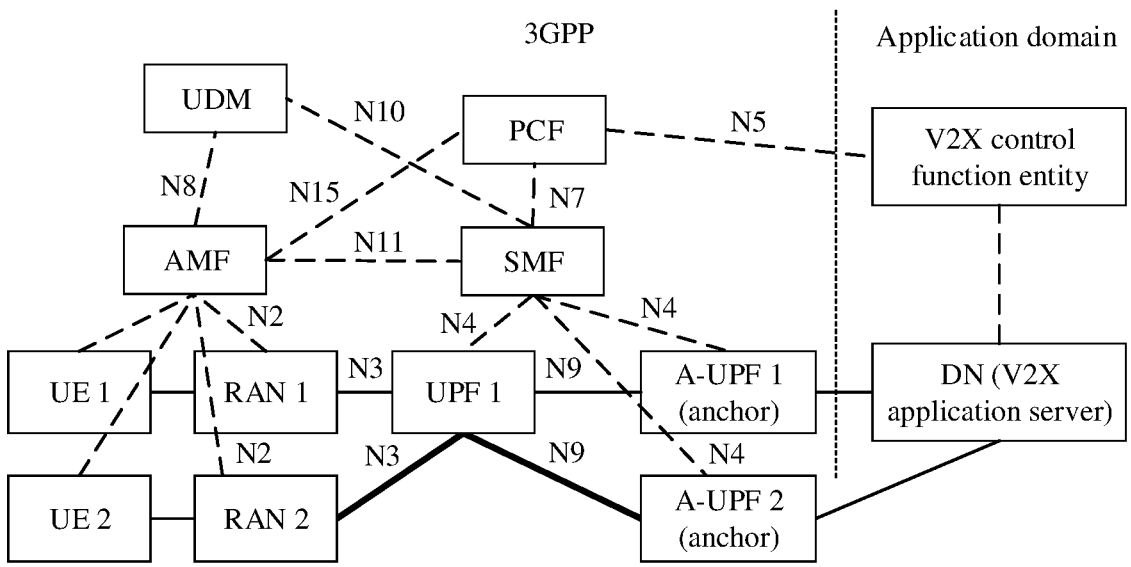
FIG. 10(b) is another schematic diagram of a network architecture to which Embodiment 3 is applicable.

As shown in FIG. 10(b), the UPF 1 is inserted between a RAN 2 and the A-UPF 2, and tunnel information of the UPF 1, tunnel information of the RAN 2, and tunnel information of the A-UPF 2 are separately updated, so that a latency of data transmission between UE 1 and the UE 2 can also be reduced. For example, when the UE 1 needs to send data to the UE 2, according to the communication method in this embodiment, a communication procedure is: UE 1→RAN 1→UPF 1→RAN 2→UE 2. The UPF 1 is also referred to as the serving UPF. According to the method in this embodiment, a latency generated when the data is transmitted from the UE 1 to the UE 2 can be reduced. This facilitates instant communication between platoon members.

Embodiment 4

Figure 11A:
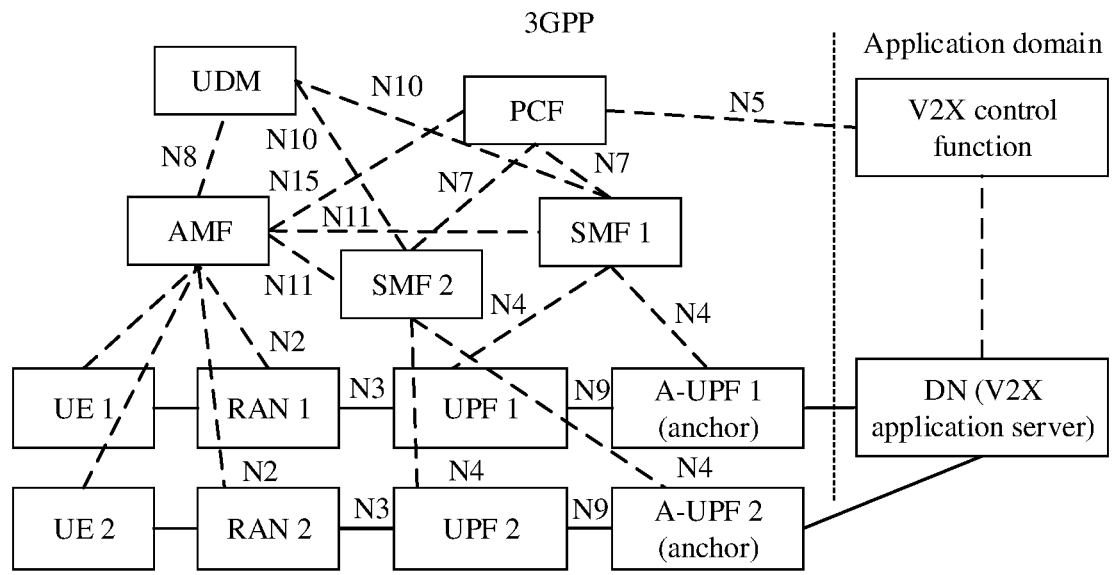
FIG. 11(a) is a schematic diagram of a network architecture to which Embodiment 4 is applicable.

A scenario of Embodiment 4 is as follows: UEs in a platoon member list belong to different UPFs and different SMFs. FIG. 11(a) is a schematic diagram of a network architecture to which Embodiment 4 is applicable. Two UEs, namely, UE 1 and UE 2, in the platoon member list are used as an example for description. In the scenario shown in FIG. 11(a), a user plane path of the UE 1 includes a UPF 1 and an A-UPF 1 (anchor UPF), and a user plane path of the UE 2 includes a UPF 2 and an A-UPF 2 (anchor UPF). It may also be understood that the UE 1 belongs to the UPF 1, the A-UPF 1, and an SMF 1, and the UE 2 belongs to the UPF 2, the A-UPF 2, and an SMF 2.

It should be noted that, in the scenario of this embodiment, a user plane path of each UE may include only one anchor UPF, or may include one anchor UPF and a plurality of other UPFs. For example, referring to FIG. 11(a), the UE 1 is used as an example. The user plane path of the UE 1 includes only the A-UPF 1, in other words, the UPF 1 in the figure is deleted, or may include the A-UPF 1 and a plurality of other UPFs (only one UPF, namely, the UPF 1, is shown in the figure). In this embodiment, the user plane path of each UE needs to include at least one UPF.

The following uses the scenario shown in FIG. 11(a) as an example for description. Currently, according to a prior-art communication method, a flow direction of data sent by the UE 1 to the UE 2 is: UE 1→base station 1 (RAN 1)→UPF 1→A-UPF 1→DN→A-UPF 2→UPF 2→base station 2 (RAN 2)→UE 2.

Figure 12:
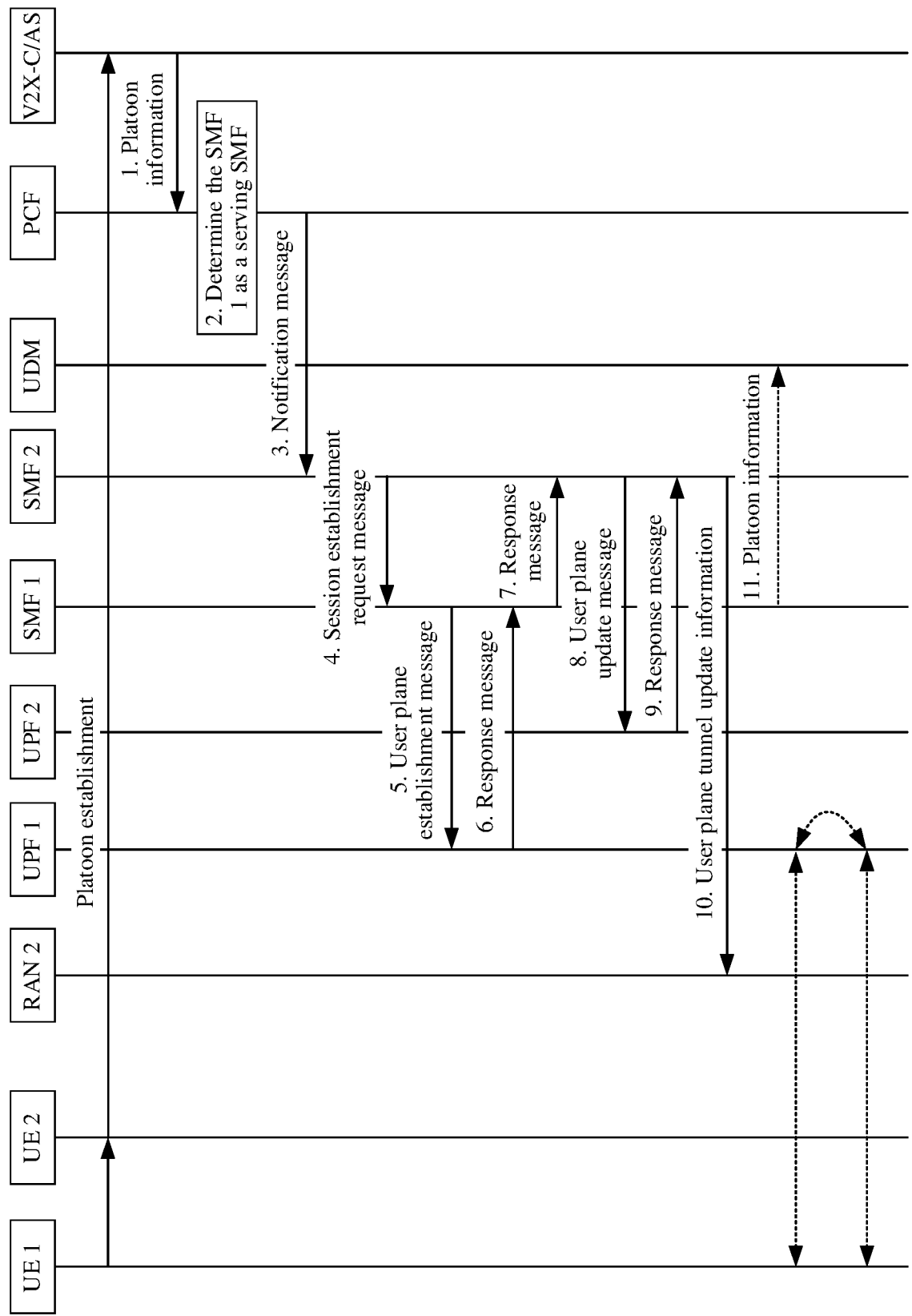
FIG. 12 is a schematic diagram of a communication method according to an embodiment of this application.

It can be learned from the foregoing procedure of communication between UEs that communication needs to pass through a relatively large quantity of network elements, and consequently a relatively great latency is caused. To resolve this problem, FIG. 12 shows a communication method according to an embodiment of this application. The communication method includes the following steps.

Step 1: V2X-C or V2X-AS sends platoon information to a PCF, and the PCF receives the platoon information from the V2X-C or the V2X-AS.

Step 2: The PCF determines that the SMF 1 is a serving UPF.

In this step, after receiving the platoon information, the PCF locally obtains contexts of platoon members based on the platoon information, and may obtain, based on the contexts, SMFs in which UEs are located, and determine that the UEs in the platoon belong to different SMFs. Specifically, the UEs belong to at least two SMFs. For example, the platoon members are the UE 1, the UE 2, UE 3, UE 4, and UE 5. The UE 1, the UE 2, and the UE 3 belong to the SMF 1, and the UE 4 and the UE 5 belong to the SMF 2. For another example, the UE 1, the UE 2, and the UE 3 belong to the SMF 1, the UE 4 belongs to the SMF 2, and the UE 5 belongs to an SMF 3. In this embodiment, two UEs, namely, the UE 1 and the UE 2, are used as an example. For example, the UE 1 belongs to the SMF 1, and the UE 2 belongs to the SMF 2.

Further, the PCF selects an SMF as a serving SMF. For example, a method for selecting the serving SMF may be selecting an SMF that covers a largest quantity of UEs in the platoon to serve as the serving SMF.

Optionally, a new SMF may be selected as the serving SMF. The new SMF is an SMF other than the UEs in the platoon.

In this embodiment, an example in which the PCF selects the SMF 1 as the serving SMF is used for description.

Step 3: The PCF sends a notification message to the SMF 2, and the SMF 2 receives the notification message from the PCF, where the notification message is used to instruct the SMF 2 to insert the SMF 1 into a PDU session of the UE 2, in other words, the SMF 1 is also used as an SMF to which the UE 2 belongs.

The notification message includes the following information:

(1) Address of the SMF 1 and first instruction information, where the first instruction information is used to instruct the SMF 2 to insert the SMF 1 into the PDU session of the UE 2, in other words, the SMF 1 is also used as the SMF to which the UE 2 belongs.

(2) Platoon information, where the platoon information needs to be forwarded by the SMF 2 to the SMF 1.

Optionally, the notification message further includes the following information:

(3) Second instruction information, where the second instruction information needs to be forwarded by the SMF 2 to the SMF 1, and is used to instruct the SMF 1 to select the serving UPF for the UEs in the platoon. Certainly, the notification message may not include the second instruction information. In other words, the SMF 1 may be implicitly instructed to select the serving UPF for the UEs in the platoon.

Step 4: The SMF 2 sends a session establishment request message to the SMF 1, and the SMF 1 receives the session establishment request message from the SMF 2.

The session establishment request message includes the following information:

(1) User plane downlink tunnel of the UPF 2.

(2) Uplink tunnel information of the RAN 2.

(3) Platoon information.

Optionally, the session establishment request message further includes the following information:

(4) Second instruction information.

The information (3) and the information (4) are from the PCF entity.

After receiving the session establishment request message, the SMF 1 selects the serving UPF. For a selection method, refer to the method for selecting a UPF in Embodiment 2. Details are not described herein again.

In this embodiment, an example in which the UPF 1 is selected as the serving UPF is used for description.

It should be noted that, in step 3 and step 4, the PCF entity first sends the notification message to the SMF 2, and then the SMF 2 sends the session establishment request message to the SMF 1. Optionally, step 3 and step 4 may be replaced with step A to step C.

Step A: The PCF sends a notification message to the SMF 1, and the SMF 1 receives the notification message from the PCF.

The notification message includes the platoon information, and the platoon information includes a platoon identifier and identifiers of the platoon members. Optionally, the identifiers of all the platoon members may be included, or only an identifier of a platoon member managed by the SMF 1 may be included.

Optionally, the notification message further includes instruction information, and the instruction information is used to instruct the SMF 1 to select the serving UPF.

If the notification message does not include the instruction information, the notification message is used to implicitly instruct, by using the sent platoon information, the SMF 1 to select the serving UPF.

After receiving the notification message, the SMF 1 selects the serving UPF, for example, selects the UPF 1 as the serving UPF. In addition, the SMF 1 further stores the serving UPF. For a storage manner, refer to the specific description in the foregoing embodiment. Details are not described herein again.

Step B: The PCF sends a notification message to the SMF 2, and the SMF 2 receives the notification message from the PCF.

The notification message is used to instruct the SMF 2 to insert the SMF 1 into a PDU session of the UE 2. In other words, the SMF 1 is also used as an SMF to which the UE 2 belongs.

Content included in the notification message is the same as the content that is carried in the notification message and that is described in step 3. Details are not described herein again. For details, refer to the foregoing description.

Step C: The SMF 2 sends a session establishment request message to the SMF 1, and the SMF 1 receives the session establishment request message from the SMF 2.

For content included in the session establishment request message, refer to the content that is carried in the session establishment request message and that is described in step 4. However, it should be noted that the platoon information carried in the session establishment request message may include only a platoon member in the platoon that is managed by the SMF 2, or may include all the members in the platoon.

After receiving the session establishment request message, the SMF 1 selects a serving UPF for a terminal managed by the SMF 2. In step A, the SMF 1 has selected and stored the serving UPF for the terminal managed by the SMF 1. Therefore, the serving UPF that has been selected by the SMF 1 may be directly used as the serving UPF of the terminal managed by the SMF 2. In other words, the selected UPF 1 is used as the serving UPF of the terminal managed by the SMF 2.

Step 5: The SMF 1 sends a user plane establishment message to the UPF 1, and the UPF 1 receives the user plane establishment message from the SMF 1.

The user plane establishment message includes tunnel information of the UPF 2, uplink tunnel information of the RAN 2, and local loopback routing information.

After the UPF 1 receives the user plane establishment message, the UPF 1 may establish a path from the UPF 1 to the UPF 2 and a path from the UPF 1 to the RAN 2.

For content and a function of the local loopback routing information, refer to Table 1 in Embodiment 1. Details are not described herein again.

Step 6: The UPF 1 sends a response message to the SMF 1, and the SMF 1 receives the response message from the UPF 1.

Step 6 is an optional step, and is performed to notify the SMF 1 that a notification message is received.

Step 7: The SMF 1 sends a response message to the SMF 2, and the SMF 2 receives the response message from the SMF 1.

The response message includes a downlink tunnel of the UPF 1.

Step 8: The SMF 2 sends a user plane update message to the UPF 2, and the UPF 2 receives the user plane update message from the SMF 2.

The user plane update message includes tunnel information of the UPF 1.

Therefore, the UPF 2 may establish a path from the UPF 2 to the UPF 1.

Step 9: The UPF 2 sends a response message to the SMF 2, and the SMF 2 receives the response message from the UPF 2.

Step 9 is an optional step, and is performed to notify the SMF 2 that the user plane update message is received.

Step 10: The SMF 2 sends a user plane tunnel update message to the base station 2 (RAN 2), and the base station 2 (RAN 2) receives the user plane tunnel update message from the SMF 2.

The user plane tunnel update message includes the downlink tunnel of the UPF 1, and the downlink tunnel of the UPF 1 is obtained by the SMF 2 in step 7.

Therefore, the base station 2 (RAN 2) may update a user plane path, and establish a path from the base station 2 (RAN 2) to the UPF 1.

Step 11: The SMF 1 sends the platoon information to a UDM.

The UDM may store the received platoon information, so that another network element can use the platoon information.

Step 11 is an optional step, or step 11 may be performed in any step after step 4.

Figure 11B:
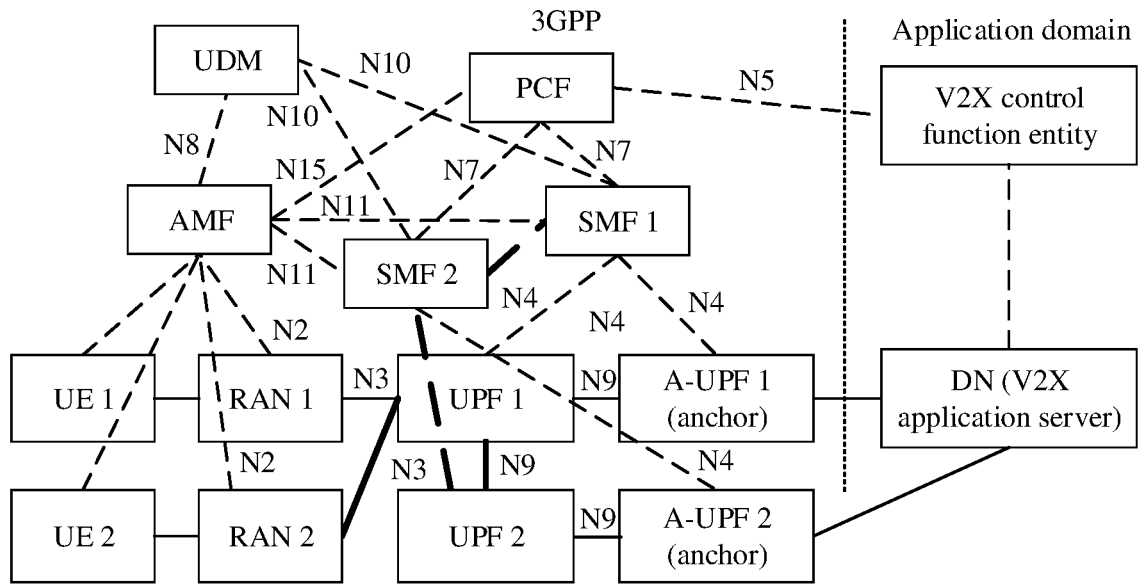
FIG. 11(b) is another schematic diagram of a network architecture to which Embodiment 4 is applicable.

According to the method in this embodiment, a network side may redirect the UEs in the platoon to a same SMF, and the SMF is used as the serving SMF of the platoon. In addition, the network side may redirect the UEs in the platoon to a same UPF, and the UPF is used as the serving UPF of the platoon. Communication between UEs in the platoon is locally implemented in the serving UPF. In this embodiment, the serving SMF (namely, the SMF 1) determines to use the UPF 1 as the serving UPF of the platoon, to insert a UPF for the UE 2, and insert the UPF 1 between the RAN 2 and the UPF 2. After the UPF 1 is inserted between the RAN 2 and the UPF 2, the system architecture shown in FIG. 11(a) is updated with the system architecture shown in FIG. 11(b). To be specific, the path between the RAN 2 and the UPF 1, the path between the UPF 1 and the UPF 2, and the path between the UPF 2 and the SMF 1 are established. Therefore, when the UE 1 needs to send data to the UE 2, according to the communication method in this embodiment, the communication procedure is: UE 1→RAN 1→UPF 1→RAN 2→UE 2. The UPF 1 is also referred to as the serving UPF. According to the method in this embodiment, a latency generated when the data is transmitted from the UE 1 to the UE 2 can be reduced. This facilitates instant communication between platoon members.

Figure 13:
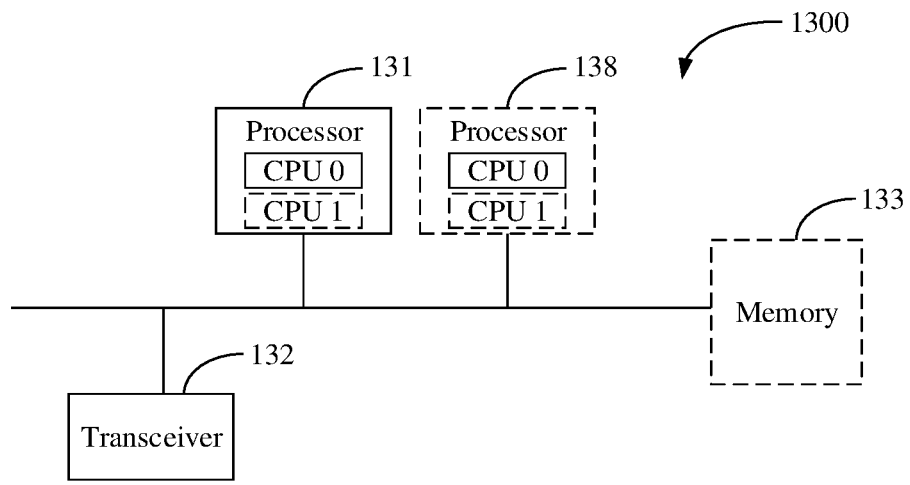
FIG. 13 is a schematic diagram of an apparatus according to an embodiment of this application.

It should be noted that all the procedures performed by the SMF 2 in Embodiment 4 may be implemented by the AMF entity. For a process in which the AMF entity implements the foregoing embodiment, refer to the implementation process of the SMF 2. Details are not described again. Based on a same inventive concept, FIG. 13 is a schematic diagram of an apparatus according to an embodiment of this application. The apparatus may be a session management function entity, and may perform the method performed by the first session management function entity (the first SMF entity) in any one of the foregoing embodiments. Alternatively, the apparatus may be a policy control function entity, and may perform the method performed by the policy control function entity (the PCF entity) in any one of the foregoing embodiments.

The apparatus 1300 includes at least one processor 131 and a transceiver 132. Optionally, the apparatus 1300 further includes a memory 133. The processor 131, the transceiver 132, and the memory 133 are connected by using a communications line.

The processor 131 may be a general-purpose central processing unit (CPU), a microprocessor, an application-specific integrated circuit (ASIC), or one or more integrated circuits configured to control program execution of the solutions of the present invention.

The communications line may include a path for transmitting information between the foregoing units.

The transceiver 132 is configured to communicate with another device or a communications network, and the transceiver includes a radio frequency circuit.

The memory 133 may be a read-only memory (ROM) or another type of static storage device capable of storing static information and instructions, or a random access memory (RAM) or another type of dynamic storage device capable of storing information and instructions. Alternatively, the memory 133 may be an electrically erasable programmable read-only memory (EEPROM), a compact disc read-only memory (CD-ROM) or another optical disk storage, an optical disc storage (including a compact optical disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer. However, this is not limited herein. The memory 133 may exist independently, and is connected to the processor 131 by the communications line. Alternatively, the memory 133 may be integrated into the processor. The memory 133 is configured to store application program code for executing the solutions of the present invention, and the processor 131 controls the execution. The processor 131 is configured to execute the application program code stored in the memory 133.

In a specific implementation, in an embodiment, the processor 131 may include one or more CPUs, for example, a CPU 0 and a CPU 1 in FIG. 13.

In specific implementation, in an embodiment, the apparatus 1300 may include a plurality of processors, for example, the processor 131 and a processor 138 in FIG. 13. Each of the processors may be a single-core processor (single-CPU), or may be a multi-core processor (multi-CPU). The processor herein may be one or more devices, circuits, and/or processing cores for processing data (for example, a computer program instruction).

It should be understood that, when the apparatus is a session management function entity, the apparatus may be configured to implement the steps performed by the first session management function entity (the first SMF entity) in the communication method in the embodiments of the present invention. For a related feature, refer to the foregoing description. Details are not described herein again.

It should be understood that, when the apparatus is a policy control function entity, the apparatus may be configured to implement the steps performed by the policy control function entity (the PCF entity) in the communication method in the embodiments of the present invention. For a related feature, refer to the foregoing description. Details are not described herein again.

Figure 14:
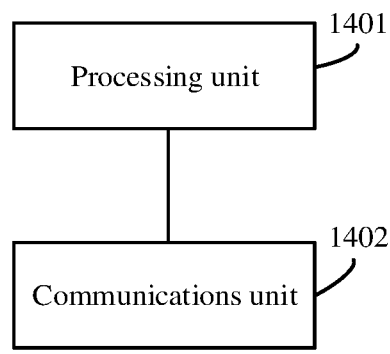
FIG. 14 is a schematic diagram of an apparatus according to an embodiment of this application.

In this application, the session management function entity may be divided into function modules based on the foregoing method examples. For example, function modules corresponding to various functions may be obtained through division, or two or more functions may be integrated into one processing module. The integrated module may be implemented in a form of hardware, or may be implemented in a form of a software function module. It should be noted that, in this application, module division is an example, and is merely a logical function division. In actual implementation, another division manner may be used. For example, when each function module is obtained through division based on each corresponding function, FIG. 14 is a schematic diagram of an apparatus. The apparatus may be the first session management function entity (the first SMF entity) in the foregoing embodiment. The apparatus includes a processing unit 1401 and a communications unit 1402.

In this embodiment, the session management function entity is presented in a form in which each function module is obtained through division based on each corresponding function, or the session management function entity is presented in a form in which each function module is obtained through division in an integrated manner. The "module" herein may be an application-specific integrated circuit (ASIC), a circuit, a processor and a memory for executing one or more software or firmware programs, an integrated logic circuit, and/or another device that can provide the foregoing function.

It should be understood that the session management function entity may be configured to implement the steps performed by the first session management function entity (the first SMF entity) in the communication method in the embodiments of the present invention. For a related feature, refer to the foregoing description. Details are not described herein again.

Figure 15:
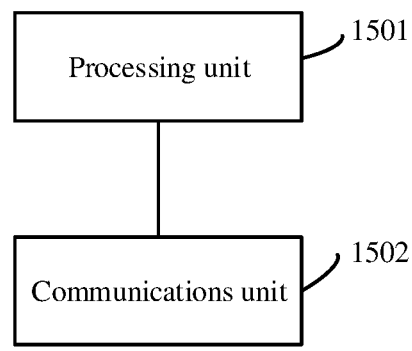
FIG. 15 is a schematic diagram of an apparatus according to an embodiment of this application.

In this application, the policy control function entity may be divided into function modules based on the foregoing method examples. For example, function modules corresponding to various functions may be obtained through division, or two or more functions may be integrated into one processing module. The integrated module may be implemented in a form of hardware, or may be implemented in a form of a software function module. It should be noted that, in this application, module division is an example, and is merely a logical function division. In actual implementation, another division manner may be used. For example, when each function module is obtained through division based on each corresponding function, FIG. 15 is a schematic diagram of an apparatus. The apparatus may be the policy control function entity in the foregoing embodiment. The apparatus includes a processing unit 1501 and a communications unit 1502.

In this embodiment, the policy control function entity is presented in a form in which each function module is obtained through division based on each corresponding function, or the policy control function entity is presented in a form in which each function module is obtained through division in an integrated manner. The "module" herein may be an application-specific integrated circuit (ASIC), a circuit, a processor and a memory for executing one or more software or firmware programs, an integrated logic circuit, and/or another device that can provide the foregoing function.

It should be understood that the policy control function entity may be configured to implement the steps performed by the policy control function entity (the PCF entity) in the communication method in the embodiments of the present invention. For a related feature, refer to the foregoing description. Details are not described herein again.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded or executed on a computer, all or some of the procedures or functions according to the embodiments of the present invention are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

Although the present invention is described with reference to the embodiments, in a process of implementing the present invention that claims protection, a person skilled in the art may understand and implement another variation of the disclosed embodiments by viewing the accompanying drawings, disclosed content, and the accompanying claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

A person skilled in the art should understand that the embodiments of this application may be provided as a method, an apparatus (device), a computer readable storage medium, or a computer program product. Therefore, this application may use a form of hardware only embodiments, software only embodiments, or embodiments with a combination of software and hardware. They are collectively referred to as "modules" or "systems".

A person skilled in the art may further understand that various illustrative logical blocks and steps that are listed in the embodiments of this application may be implemented by using electronic hardware, computer software, or a combination thereof. Whether the functions are implemented by using hardware or software depends on particular applications and a design requirement of the entire system. A person of ordinary skill in the art may use various methods to implement the described functions for each particular application, but it should not be considered that the implementation goes beyond the scope of the embodiments of this application.

The various illustrative logical units and circuits described in the embodiments of the present invention may implement or operate the described functions by using a general processor, a digital signal processor, an application-specific integrated circuit (ASIC), a field programmable gate array (FPGA) or another programmable logical apparatus, a discrete gate or transistor logic, a discrete hardware component, or a design of any combination thereof. The general processor may be a microprocessor. Optionally, the general processor may also be any conventional processor, controller, microcontroller, or state machine. The processor may also be implemented by a combination of computing apparatuses, such as a digital signal processor and a microprocessor, multiple microprocessors, one or more microprocessors with a digital signal processor core, or any other similar configuration.

Steps of the methods or algorithms described in the embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may connect to a processor so that the processor may read information from the storage medium and write information to the storage medium. Alternatively, the storage medium may further be integrated into a processor. The processor and the storage medium may be arranged in an ASIC, and the ASIC may be arranged in terminal device. Alternatively, the processor and the storage medium may also be arranged in different components of the terminal device.

In one or more example designs, the functions described in the embodiments of this application may be implemented by using hardware, software, firmware, or any combination thereof. If the present invention is implemented by software, these functions may be stored in a computer-readable medium or are transmitted to the computer-readable medium in a form of one or more instructions or code. The computer-readable medium is either a computer storage medium or a communications medium that enables a computer program to move from one place to another. The storage medium may be an available medium that may be accessed by any general or special computer. For example, such a computer-readable medium may include but is not limited to a RAM, a ROM, an EEPROM, a CD-ROM, or another optical disc storage, a disk storage or another magnetic storage apparatus, or any other medium that may be used to carry or store program code, where the program code is in a form of an instruction or a data structure or in a form that can be read by a general or special computer or a general or special processor. In addition, any connection may be appropriately defined as a computer-readable medium. For example, if software is transmitted from a website, a server, or another remote resource by using a coaxial cable, an optical fiber computer, a twisted pair, a digital subscriber line (DSL) or in a wireless manner, such as infrared, radio, or microwave, the software is included in a defined computer-readable medium. The disc (disk) and the disk (disc) and the disk (disk) include a compressed disk, a laser disk, an optical disc, a DVD, a floppy disk, and a Blu-ray disc. The disk generally copies data by a magnetic means, and the disc generally copies data optically by a laser means. The foregoing combination may also be included in the computer-readable medium.

This application is described with reference to the flowcharts and/or block diagrams of the method, the apparatus (device), and the computer program product according to an embodiment of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

Although the present invention is described with reference to specific features and the embodiments thereof, obviously, various modifications and combinations may be made to them without departing from the spirit and scope of the present invention. Correspondingly, the specification and accompanying drawings are merely example description of the present invention defined by the accompanying claims, and is considered as any of or all modifications, variations, combinations or equivalents that cover the scope of the present invention. Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A communication method, comprising:
    determining, by a session management function entity based on information of a terminal group, one or more user plane function entities accessed by one or more terminals in the terminal group;
    selecting, by the session management function entity, a target user plane function entity from the one or more user plane function entities accessed by the one or more terminals; and
    sending, by the session management function entity, routing information to the target user plane function entity, wherein the routing information is configured for communication between terminals in the terminal group through the target user plane function entity, and the communication does not pass through a data network.

2. The method according to claim 1, wherein selecting, by the session management function entity, the target user plane function entity from the one or more user plane function entities accessed by the one or more terminals comprises:
    selecting, by the session management function entity, the target user plane function entity from the one or more user plane function entities accessed by the one or more terminals based on one or more of following:
    a service range of the one or more user plane function entities accessed by the one or more terminals, locations of the terminals in the terminal group, or a quantity of terminals in the terminal group that are served by the one or more user plane function entities accessed by the one or more terminals.

3. The method according to claim 1, wherein the method further comprises:
    sending, by the session management function entity, a first notification message to the target user plane function entity, wherein the first notification message comprises tunnel information of a first terminal in the terminal group, and a user plane function entity accessed by the first terminal is different from the target user plane function entity.

4. The method according to claim 3, wherein the method further comprises:
    sending, by the session management function entity, a second notification message to a base station accessed by the first terminal, wherein the second notification message comprises tunnel information of the target user plane function entity.

5. The method according to claim 1, wherein the method further comprises:
    receiving, by the session management function entity from a policy control function entity, first instruction information, wherein the first instruction information instructs the session management function entity to select a user plane function entity used by a terminal in the terminal group to perform communication.

6. The method according to claim 1, wherein the method further comprises:
    receiving, by the session management function entity from a policy control function entity, second instruction information, wherein the second instruction information instructs the session management function entity to select a user plane function entity accessed by a second terminal in the terminal group to perform communication, and the second terminal corresponds to the session management function entity; and
    wherein determining, by the session management function entity, the target user plane function entity based on the one or more user plane function entities accessed by the one or more terminals comprises:
    determining, by the session management function entity, the target user plane function entity based on the user plane function entity accessed by the second terminal.

7. The method according to claim 1, wherein the method further comprises:
    receiving, by the session management function entity, a second request message from a target network element, wherein the second request message requests the session management function entity to select a user plane function entity accessed by a third terminal in the terminal group to perform communication, and the third terminal corresponds to the target network element; and wherein determining, by the session management function entity, the target user plane function entity based on the one or more user plane function entities accessed by the one or more terminals comprises:

determining, by the session management function entity, the target user plane function entity based on a user plane function entity accessed by a second terminal in the terminal group, wherein the second terminal corresponds to the session management function entity, and the target network element is a second session management function entity or an access and mobility management function entity.

8. The method according to claim 1, wherein information of the terminal group comprises an identifier of the terminal group and identifiers of the terminals in the terminal group; and the method further comprises:

storing, by the session management function entity, the target user plane function entity and the identifier of the terminal group in contexts of the terminals in the terminal group, wherein the session management function entity is configured to, according to the context of the terminals in the terminal group, obtain the target user plane function entity from the contexts of the terminals in the terminal group; or locally storing, by the session management function entity, a correspondence between the target user plane function entity and the identifier of the terminal group, wherein the session management function entity is configured to obtain the target user plane function entity from the correspondence.

9. The method according to claim 1, wherein selecting, by the session management function entity, the target user plane function entity from the one or more user plane function entities accessed by the one or more terminals comprises:

selecting, by the session management function entity, the target user plane function entity from the one or more user plane function entities accessed by the one or more terminals based on a load of the one or more user plane function entities accessed by the one or more terminals.

10. An apparatus, comprising:

at least one processor, and a non-transitory memory storing computer-executable instructions;

wherein the computer-executable instructions, when executed by the at least one processor, cause the apparatus to:

determine, based on information of a terminal group, one or more user plane function entities accessed by one or more terminals in the terminal group;

select a target user plane function entity from the one or more user plane function entities accessed by the one or more terminals; and send routing information to the target user plane function entity, wherein the routing information is configured for communication between terminals in the terminal group through the target user plane function entity, and the communication does not pass through a data network.

11. The apparatus according to claim 10, wherein the computer-executable instructions, when executed by the at least one processor, cause the apparatus further to:

select the target user plane function entity from the one or more user plane function entities accessed by the one or more terminals based on one or more of following:

a service range of the one or more user plane function entities accessed by the one or more terminals, locations of the terminals in the terminal group, or a quantity of terminals in the terminal group that are served by the one or more user plane function entities accessed by the one or more terminals.

12. The apparatus according to claim 10, wherein the computer-executable instructions, when executed by the at least one processor, cause the apparatus further to:

send a first notification message to the target user plane function entity, wherein the first notification message comprises tunnel information of a first terminal in the terminal group, and a user plane function entity accessed by the first terminal is different from the target user plane function entity.

13. The apparatus according to claim 12, wherein the computer-executable instructions, when executed by the at least one processor, cause the apparatus further to:

send a second notification message to a base station accessed by the first terminal, wherein the second notification message comprises tunnel information of the target user plane function entity.

14. The apparatus according to claim 10, wherein the computer-executable instructions, when executed by the at least one processor, cause the apparatus further to:

receive first instruction information, wherein the first instruction information instructs the apparatus to select a user plane function entity used by a terminal in the terminal group to perform communication.

15. The apparatus according to claim 10, wherein the computer-executable instructions, when executed by the at least one processor, cause the apparatus further to:

send second instruction information, wherein the second instruction information instructs the apparatus to select a user plane function entity accessed by a second terminal in the terminal group to perform communication, and the second terminal corresponds to the apparatus; and determine the target user plane function entity based on the user plane function entity accessed by the second terminal.

16. The apparatus according to claim 10, wherein information of the terminal group comprises an identifier of the terminal group and identifiers of the terminals in the terminal group; and the computer-executable instructions, when executed by the at least one processor, cause the apparatus further to:

store the target user plane function entity and the identifier of the terminal group in contexts of the terminals in the terminal group, wherein the apparatus is configured to obtain the target user plane function entity from the contexts of the terminals in the terminal group; or locally store a correspondence between the target user plane function entity and the identifier of the terminal group, wherein the apparatus is configured to obtain the target user plane function entity from the correspondence.

17. The apparatus according to claim 10, wherein the computer-executable instructions, when executed by the at least one processor, cause the apparatus further to:

select the target user plane function entity from the one or more user plane function entities accessed by the one or more terminals based on a load of the one or more user plane function entities accessed by the one or more terminals.

18. A non-transitory storage medium, comprising computer-executable instructions which, when executed by at least one processor of an apparatus, cause the apparatus to:

determine, based on information of a terminal group, one or more user plane function entities accessed by one or more terminals in the terminal group;

select a target user plane function entity from the one or more user plane function entities accessed by the one or more terminals; and send routing information to the target user plane function entity, wherein the routing information is configured for communication between terminals in the terminal group through the target user plane function entity, and the communication does not pass through a data network.

19. The non-transitory storage medium according to claim 18, wherein the computer-executable instructions, when executed by the at least one processor, cause the apparatus further to:

select the target user plane function entity from the one or more user plane function entities accessed by the one or more terminals based on one or more of following:

a service range of the one or more user plane function entities accessed by the one or more terminals, locations of the terminals in the terminal group, or a quantity of terminals in the terminal group that are served by the one or more user plane function entities accessed by the one or more terminals.

20. The non-transitory storage medium according to claim 18, wherein the computer-executable instructions, when executed by the at least one processor, cause the apparatus further to:

receive a first instruction information, wherein the first instruction information instructs the apparatus to select a user plane function entity used by a terminal in the terminal group to perform communication.

* * * * *